US010167399B2

(12) United States Patent
Masada et al.

(10) Patent No.: US 10,167,399 B2
(45) Date of Patent: Jan. 1, 2019

(54) INK, INK CARTRIDGE, AND IMAGE RECORDING METHOD

(71) Applicant: CANON KABUSHIKI KAISHA, Tokyo (JP)

(72) Inventors: Yohei Masada, Tokyo (JP); Masahiro Terada, Hadano (JP); Hidetaka Kawamura, Yokohama (JP); Akihiro Taya, Yokohama (JP); Masanobu Ootsuka, Tokyo (JP); Takaharu Aotani, Tokyo (JP); Shoji Koike, Yokohama (JP); Yutaka Yoshimasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/281,139

(22) Filed: Sep. 30, 2016

(65) Prior Publication Data
US 2017/0210918 A1 Jul. 27, 2017

(30) Foreign Application Priority Data
Jan. 22, 2016 (JP) .................................. 2016-010899

(51) Int. Cl.
*C09D 11/033* (2014.01)
*C09D 11/037* (2014.01)
*C09D 11/102* (2014.01)
*C09D 11/107* (2014.01)
*C09D 11/322* (2014.01)
*C09D 11/324* (2014.01)
*C09D 11/38* (2014.01)

(52) U.S. Cl.
CPC .......... *C09D 11/037* (2013.01); *C09D 11/033* (2013.01); *C09D 11/102* (2013.01); *C09D 11/107* (2013.01); *C09D 11/322* (2013.01); *C09D 11/324* (2013.01); *C09D 11/38* (2013.01)

(58) Field of Classification Search
CPC ... C09D 11/037; C09D 11/107; C09D 11/102; C09D 11/324; C09D 11/322; C09D 11/033; C09D 11/38
See application file for complete search history.

(56) References Cited

U.S. PATENT DOCUMENTS

| 4,557,761 A | 12/1985 | Kobayashi et al. |
| 4,632,703 A | 12/1986 | Koike et al. |
| 4,661,158 A | 4/1987 | Kobayashi et al. |
| 4,689,078 A | 8/1987 | Koike et al. |
| 4,702,742 A | 10/1987 | Iwata et al. |
| 4,725,849 A | 2/1988 | Koike et al. |
| 4,838,938 A | 6/1989 | Tomida et al. |
| 4,849,770 A | 7/1989 | Koike et al. |
| 4,853,036 A | 8/1989 | Koike et al. |
| 4,923,515 A | 5/1990 | Koike et al. |
| 4,957,553 A | 9/1990 | Koike et al. |
| 4,965,609 A | 10/1990 | Tomida et al. |
| 4,965,612 A | 10/1990 | Sakaki et al. |
| 4,969,951 A | 11/1990 | Koike et al. |
| 4,973,499 A | 11/1990 | Iwata et al. |
| 4,986,850 A | 1/1991 | Iwata et al. |
| 5,017,227 A | 5/1991 | Koike et al. |
| 5,053,078 A | 10/1991 | Koike et al. |
| 5,067,980 A | 11/1991 | Koike et al. |
| 5,075,699 A | 12/1991 | Koike et al. |
| 5,099,255 A | 3/1992 | Koike et al. |
| 5,101,217 A | 3/1992 | Iwata et al. |
| 5,118,351 A | 6/1992 | Shirota et al. |
| 5,124,718 A | 6/1992 | Koike et al. |
| 5,141,558 A | 8/1992 | Shirota et al. |
| 5,151,128 A | 9/1992 | Fukushima et al. |
| 5,190,581 A | 3/1993 | Fukushima et al. |
| 5,220,347 A | 6/1993 | Fukushima et al. |
| 5,221,333 A | 6/1993 | Shirota et al. |
| 5,248,991 A | 9/1993 | Shirota et al. |
| 5,250,121 A | 10/1993 | Yamamoto et al. |
| 5,254,157 A | 10/1993 | Koike et al. |
| 5,257,036 A | 10/1993 | Koike et al. |
| 5,258,066 A | 11/1993 | Kobayashi et al. |
| 5,296,022 A | 3/1994 | Kobayashi et al. |
| 5,329,305 A | 7/1994 | Fukushima et al. |
| 5,358,558 A | 10/1994 | Yamamoto et al. |
| 5,380,358 A | 1/1995 | Aoki et al. |
| 5,396,275 A | 3/1995 | Koike et al. |

(Continued)

FOREIGN PATENT DOCUMENTS

EP 2 522 701 A1 11/2012
EP 2 692 537 A1 2/2014

(Continued)

OTHER PUBLICATIONS

US 5,123,959, 06/1992, Fukushima et al. (withdrawn)
U.S. Appl. No. 15/281,138, filed Sep. 30, 2016, Applicants: Takaharu Aotani, et al.
U.S. Appl. No. 15/281,140, filed Sep. 30, 2016, Applicants: Yutaka Yoshimasa, et al.
U.S. Appl. No. 15/281,141, filed Sep. 30, 2016, Applicants: Hidetaka Kawamura, et al.
U.S. Appl. No. 15/281,143, filed Sep. 30, 2016, Applicants: Hidetaka Kawamura, et al.

(Continued)

*Primary Examiner* — Patrick D Niland
(74) *Attorney, Agent, or Firm* — Venable LLP

(57) ABSTRACT

Provided is Ink including a pigment, a resin, a water-soluble organic solvent, and water, wherein a solid content of first liquid as prepared by diluting the ink 500-fold with water and by adding $CaCl_2$ at a concentration of 1.5 mM has a rate of aggregation of 1.5 nm/second or less; and a solid content of second liquid as prepared, after the ink has been stored at 60° C. for 2 weeks, by diluting the ink 500-fold with water and by adding $CaCl_2$ at a concentration of 5 mM has a rate of aggregation of 2.0 nm/second or more.

20 Claims, 2 Drawing Sheets

(56) References Cited

U.S. PATENT DOCUMENTS

| | | |
|---|---|---|
| 5,468,553 A | 11/1995 | Koike et al. |
| 5,494,733 A | 2/1996 | Koike et al. |
| 5,500,023 A | 3/1996 | Koike et al. |
| 5,515,093 A | 5/1996 | Haruta et al. |
| 5,540,764 A | 7/1996 | Haruta et al. |
| 5,594,485 A | 1/1997 | Koike et al. |
| 5,645,631 A | 7/1997 | Koike et al. |
| 5,658,376 A | 8/1997 | Noguchi et al. |
| 5,686,951 A | 11/1997 | Koike et al. |
| 5,698,478 A | 12/1997 | Yamamoto et al. |
| 5,718,793 A | 2/1998 | Inamoto et al. |
| 5,764,261 A | 6/1998 | Koike et al. |
| 5,781,216 A | 7/1998 | Haruta et al. |
| 5,782,967 A | 7/1998 | Shirota et al. |
| 5,902,387 A | 5/1999 | Suzuki et al. |
| 5,922,625 A | 7/1999 | Haruta et al. |
| 6,033,066 A | 3/2000 | Koike et al. |
| 6,036,307 A | 3/2000 | Hakamada et al. |
| 6,139,939 A | 10/2000 | Haruta et al. |
| 6,214,963 B1 | 4/2001 | Noguchi et al. |
| 6,394,597 B1 | 5/2002 | Koike et al. |
| 6,398,355 B1 | 6/2002 | Shirota et al. |
| 6,426,766 B1 | 7/2002 | Shirota et al. |
| 6,474,803 B1 | 11/2002 | Shirota et al. |
| 6,552,156 B2 | 4/2003 | Noguchi et al. |
| 6,613,821 B2 | 9/2003 | Suzuki et al. |
| 6,619,791 B2 | 9/2003 | Tochihara et al. |
| 6,676,254 B2 | 1/2004 | Nagashima et al. |
| 6,698,876 B2 | 3/2004 | Sato et al. |
| 6,723,137 B1 | 4/2004 | Hakamada et al. |
| 6,874,881 B2 | 4/2005 | Suzuki et al. |
| 6,932,467 B2 | 8/2005 | Kawamura |
| 7,029,109 B2 | 4/2006 | Shirota et al. |
| 7,055,943 B2 | 6/2006 | Suzuki et al. |
| 7,141,105 B2 | 11/2006 | Udagawa et al. |
| 7,144,449 B2 | 12/2006 | Udagawa et al. |
| 7,185,978 B2 | 3/2007 | Nagashima et al. |
| 7,306,664 B2 | 12/2007 | Kato et al. |
| 7,429,291 B2 | 9/2008 | Udagawa et al. |
| 7,449,056 B2 | 11/2008 | Kato et al. |
| 7,464,965 B2 | 12/2008 | Udagawa et al. |
| 7,605,124 B2 | 10/2009 | Masada et al. |
| 7,611,570 B2 | 11/2009 | Koike et al. |
| 7,641,723 B2 | 1/2010 | Koike et al. |
| 7,827,982 B2 | 11/2010 | Masada et al. |
| 7,926,931 B2 | 4/2011 | Katsuragi et al. |
| 8,029,609 B2 | 10/2011 | Masada et al. |
| 8,308,198 B2 | 11/2012 | Udagawa et al. |
| 8,328,341 B2 | 12/2012 | Koike et al. |
| 8,328,926 B2 | 12/2012 | Koike et al. |
| 8,408,691 B2 | 4/2013 | Koike et al. |
| 8,506,067 B2 | 8/2013 | Koike et al. |
| 9,056,991 B2 | 6/2015 | Clarke |
| 9,074,103 B2 | 7/2015 | Flores et al. |
| 2005/0090599 A1* | 4/2005 | Spinelli ............... B01F 17/0028 524/543 |
| 2007/0221215 A1 | 9/2007 | Sugita et al. |
| 2012/0308786 A1 | 12/2012 | Shioda et al. |
| 2013/0123426 A1 | 5/2013 | Clarke |
| 2013/0196124 A1 | 8/2013 | Flores et al. |
| 2013/0222462 A1 | 8/2013 | Okubo et al. |
| 2013/0300803 A1 | 11/2013 | Shiiba et al. |
| 2014/0313265 A1 | 10/2014 | Himura et al. |

FOREIGN PATENT DOCUMENTS

| | | |
|---|---|---|
| EP | 2 862 907 A1 | 4/2015 |
| EP | 2 937 390 A1 | 10/2015 |
| JP | 2013-527267 A | 6/2013 |
| JP | 2013-535548 A | 9/2013 |

OTHER PUBLICATIONS

Nov. 23, 2016 European Search Report in European Patent Appln. 16191816.4.

Yuan Yu, et al., "Coagulation Kinetics of Surface Modified Pigment Particles," International Conference on Digital Printing Technologies, Sep. 2002, pp. 383-387.

* cited by examiner

INK, INK CARTRIDGE, AND IMAGE RECORDING METHOD

BACKGROUND OF THE INVENTION

Field of the Invention

The present invention relates to an ink, an ink cartridge, and an image recording method.

Description of the Related Art

An inkjet recording method is one of the image recording methods that have been significantly developing in recent years because a high-quality color image can be easily recorded by the method despite the fact that its principle is simple. In addition, the method has rapidly become widespread not only in the image recording of a document, a photograph, and the like in households that has heretofore been mainstream but also in offices and industrial applications.

Various ink compositions have heretofore been investigated for the purpose of increasing the optical density of an image to be recorded on a recording medium, such as plain paper. For example, there has been proposed an ink obtained by blending a self-dispersion pigment having bonded thereto a functional group having a high calcium index value and a dispersion liquid of a polyurethane prepolymer, the ink being capable of recording an image having satisfactory color developability (Japanese Patent Application Laid-Open No. 2013-535548).

SUMMARY OF THE INVENTION

The present invention is directed to provide an ink that can record an image excellent in color developability irrespective of whether the ink is used before or after high-temperature storage. The present invention is also directed to provide an ink cartridge and an image recording method each using the ink.

According to one embodiment of the present invention, there is provided an ink including a pigment, a resin, a water-soluble organic solvent, and water, wherein a solid content of first liquid as prepared by diluting the ink 500-fold with water and by adding $CaCl_2$ at a concentration of 1.5 mM has a rate of aggregation of 1.5 nm/second or less; and a solid content of second liquid as prepared, after the ink has been stored at 60° C. for 2 weeks, by diluting the ink 500-fold with water and by adding $CaCl_2$ at a concentration of 5 mM has a rate of aggregation of 2.0 nm/second or more.

According to another embodiment of the present invention, there is provided an ink cartridge, including an ink and an ink storage portion configured to store the ink, the ink including the above-mentioned ink.

According to still another embodiment of the present invention, there is provided an image recording method, including an ink-applying step of applying an ink to a recording medium, the ink including the above-mentioned ink.

Further features of the present invention will become apparent from the following description of exemplary embodiments with reference to the attached drawings.

DESCRIPTION OF THE EMBODIMENTS

Figure 1:
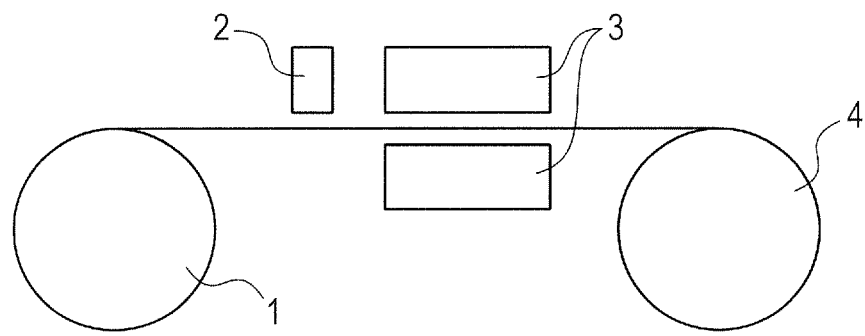
FIG. 1 is a schematic view for illustrating an example of an image recording apparatus to be used in an image recording method of the present invention.

Preferred embodiments of the present invention will now be described in detail in accordance with the accompanying drawings.

The inventors of the present invention have made an investigation, and as a result, have found that the use of the ink proposed in Japanese Patent Application Laid-Open No. 2013-535548 can record an image having satisfactory color developability. However, the inventors have also found that when the ink proposed in Japanese Patent Application Laid-Open No. 2013-535548 is stored at a high temperature of, for example, about 60° C. for a certain time period, the color developability of an image to be recorded remarkably reduces.

The inventors of the present invention have made extensive investigations with a view to providing an ink that can record an image excellent in color developability irrespective of whether the ink is used before or after high-temperature storage. As a result, the inventors have reached the present invention.

The present invention provides an ink, including a pigment, a resin, a water-soluble organic solvent, and water, the ink, when it is diluted 500-fold with water and supplemented with $CaCl_2$ at a concentration of 1.5 mM to prepare a first liquid, the first liquid containing a solid content has a rate of aggregation of 1.5 nm/second or less, the ink, when it is stored at 60° C. for 2 weeks and then diluted 500-fold with water and supplemented with $CaCl_2$ at a concentration of 5 mM to prepare a second liquid, the second liquid containing a solid content has a rate of aggregation of 2.0 nm/second or more.

An embodiment of the present invention is described below, but the present invention is not limited to the following embodiment. Various physical property values herein are values at normal temperature (25° C.) unless otherwise stated. The inventors of the present invention have investigated an aqueous ink containing a pigment and a resin, the ink being capable of recording an image excellent in color developability irrespective of whether the ink is used before or after high-temperature storage. As a result, the inventors have found that when the ink satisfies the following requirements (1) and (2), the ink can record an image excellent in color developability irrespective of whether the ink is used before or after high-temperature storage:

(1) a solid content in a first liquid prepared by diluting the ink 500-fold with water and by adding $CaCl_2$ at a concentration of 1.5 mM has a rate of aggregation of 1.5 nm/second or less; and (2) a solid content in a second liquid prepared, after the ink has been stored at 60° C. for 2 weeks, by diluting the ink 500-fold with water and by adding $CaCl_2$ at a concentration of 5 mM has a rate of aggregation of 2.0 nm/second or more.

Although the mechanism via which the satisfaction of the requirements (1) and (2) provides an ink that can record an image excellent in color developability irrespective of whether the ink is used before or after high-temperature storage is not necessarily clear, the inventors of the present invention have assumed the mechanism to be as described below.

In order to record an image excellent in color developability, the pigment in the ink needs to be caused to stay as close to the surface of a recording medium as possible without being caused to permeate into the recording medium. Accordingly, it is important that the permeation of the pigment into the recording medium be suppressed by quickly aggregating the pigment on the surface of the recording medium. That is, it is assumed that when the aggregation of the pigment is earlier than its permeation, the pigment stays close to the surface of the recording medium, and hence an image having a high optical density and excellent in color developability can be recorded.

In order to quickly aggregate the pigment on the surface of the recording medium, for example, the following measures are needed: an aggregation probability is increased by increasing the frequency at which the particles of the pigment in the ink collide with each other; and the dispersion breakage of the pigment is caused by an environmental change, such as a change in ion concentration or pH, on the recording medium. A measure, such as the aggregation of the pigment through a reaction with an ion eluted from the recording medium by the impingement of the ink, is also conceivable. That is, for example, the following methods are conceivable: (i) a solid content concentration in the ink is increased; (ii) the pH of the ink is reduced; (iii) the salt strength of the ink is increased; and (iv) a pigment in which a functional group that can react with an ion is bonded to the surface of each particle is used.

However, when an ink containing a high concentration of a pigment is exposed to high temperature during its transportation or storage, the frequency at which the particles of the pigment collide with each other further increases during the storage, and hence the pigment is liable to aggregate in the ink. Similarly, when an ink reduced in repulsive force between the particles of its pigment by a reduction in pH or an increase in salt strength is exposed to high temperature during its transportation or storage, the pigment increased in collision frequency is liable to aggregate in the ink. As a result, the dispersion stability of the pigment reduces, and hence the precipitation of the pigment or the thickening of the ink is liable to occur. In addition, in the case of a pigment in which a functional group that can react with an ion is bonded to the surface of each particle, the functional group is eliminated by high temperature and hence reactivity with an ion eluted from a recording medium reduces. Accordingly, the aggregation of the pigment hardly occurs on the surface of the recording medium, and hence the color developability of an image reduces. That is, in order that an image having satisfactory color developability may be recorded with the ink even when the ink is exposed to high temperature, it is necessary that the rate of aggregation of the pigment (solid content) before its high-temperature storage be controlled to a certain value or less, and the rate of aggregation of the pigment (solid content) after the high-temperature storage be controlled to a certain value or more.

The range of the rate of aggregation varies to some extent depending on the rate at which the ink permeates into the recording medium on which an image is to be recorded. An ink of the present invention is particularly effective as, for example, an ink for recording an image on a recording medium having an ink permeation coefficient measured by the Bristow method of 0.1 mL/($m^2 \cdot ms^{1/2}$) or more and 3.0 mL/($m^2 \cdot ms^{1/2}$) or less (e.g., plain paper or inkjet paper).

(Rate of Aggregation)

The rate of aggregation of the solid content in the first liquid prepared by diluting the ink of the present invention 500-fold with water and by adding $CaCl_2$ at a concentration of 1.5 mM is 1.5 nm/second or less. In addition, the rate of aggregation of the solid content in the second liquid prepared, after the ink of the present invention has been stored at 60° C. for 2 weeks, by diluting the ink 500-fold with water and by adding $CaCl_2$ at a concentration of 5 mM is 2.0 nm/second or more. The rate of aggregation of the solid content in the first liquid is preferably 1.5 nm/second or less, more preferably 0.7 nm/second or less. In addition, the rate of aggregation of the solid content in the second liquid is preferably 2.0 nm/second or more, more preferably 2.0 nm/second or more and 4.0 nm/second or less.

The rate of aggregation of the solid content in the first liquid is 1.5 nm/second or less, and hence even when the ink of the present invention is stored at high temperature, the sedimentation of its pigment or the thickening of the ink due to aggregation hardly occurs. In addition, the rate of aggregation of the solid content in the second liquid is 2.0 nm/second or more, and hence the use of the ink of the present invention can record an image having high color developability on a recording medium having a general ink permeation rate, such as plain paper or inkjet paper.

Although the influences of the respective rates of aggregation of the solid contents in the first and second liquids on the color developability of an image to be recorded are not necessarily clear, the inventors of the present invention have assumed the influences to be as described below. Calcium carbonate and the like serving as components for increasing the whiteness or opacity of a recording medium are present on the surface of the recording medium. Accordingly, when a metal ion, such as calcium, is eluted in an impinged ink, the dispersibility of a solid content in the ink is broken and hence the aggregation of its pigment occurs. Although the content of the components, such as calcium carbonate, varies to some extent depending on the recording medium, most of the components are unevenly distributed toward the surface of the recording medium, and hence the variation is not significant to the ink that is to impinge. Accordingly, it can be said that there is a correlation between the rate of aggregation of each of the solid contents in the first and second liquids, and the rate of aggregation of the solid content in the ink on the surface of a general recording medium, such as plain paper or inkjet paper. Therefore, it is assumed that an ink that can record an image excellent in color developability irrespective of whether the ink is used before or after high-temperature storage is obtained by controlling the respective rates of aggregation of the solid contents in the first and second liquids.

The rate of aggregation of the solid content in the first liquid and the rate of aggregation of the solid content in the second liquid may each be appropriately adjusted to fall within a predetermined range by, for example, the adjustment of the pH of the ink, the regulation of the concentration of pigment or resin particles in the ink, or the addition of a salt to the ink.

In order to record an image more excellent in color developability, the rate of aggregation of a solid content in a liquid (third liquid) prepared by diluting the ink of the present invention 500-fold with water and by adding $CaCl_2$ at a concentration of 5 mM is preferably 2.0 nm/second or more. In addition, the rate of aggregation of the solid content in the second liquid is preferably slower than the rate of aggregation of the solid content in the first liquid for the storage stability of the ink.

(Method of Measuring Rate of Aggregation)

The rates of aggregation of the solid contents in the first and second liquids may be measured with reference to the description of International Conference on Digital Printing Technologies, September 2002; p. 383-387, Yuan Yu et. al. "Coagulation Kinetics of Surface Modified Pigment Particles." That is, after a predetermined amount of a calcium chloride solution has been added to an ink-diluted liquid, a change in particle diameter of a pigment with time is measured, and the rate at which the particle diameter increases is measured and calculated as a "rate of aggregation."

A concentrated type particle diameter analyzer (trade name "FPAR-1000", manufactured by Otsuka Electronics Co., Ltd.) may be used as an apparatus for measuring the particle diameter of a pigment. The calcium chloride solution is added in such an amount as to have a predetermined concentration to the ink diluted 500-fold, followed by mixing. Immediately after the mixing, the measurement of the particle diameter of the pigment is started. The particle diameter of the pigment is measured at an interval of 2 seconds for 900 seconds. After the completion of the measurement, the initial gradient of a change in particle diameter is determined, and is defined as a rate of aggregation. Then, the rates of aggregation are measured at various calcium chloride concentrations (concentrations at the time of the measurement of from 0.5 mM to 10 mM). The dilution ratio of the ink was set to 500 (provided on a mass basis) serving as a concentration that could be measured for retaining an interaction between the particles of the ink.

<Ink>

The ink of the present invention contains a pigment, a resin, a water-soluble organic solvent, and water. The components constituting the ink of the present invention, the physical properties of the ink, and the like are described in detail below.

(Pigment)

Any one of the pigments that can be dispersed in water, such as a resin-dispersed pigment and a self-dispersion pigment, may be used as the pigment. Examples of the kind of the pigment may include an inorganic pigment and an organic pigment, and any one of the known pigments that may be used in inks may be used.

Examples of the inorganic pigment may include furnace black, acetylene black, channel black, thermal black, and lamp black. More specifically, commercially available carbon blacks as described below may be used. That is, examples thereof may include carbon blacks available under the following trade names: RAVEN: 7000, 5750, 5250, 5000 ULTRA, 3500, 2000, 1500, 1255, 1250, 1200, 1190 ULTRA-II, and 1170 (that are manufactured by Columbia Carbon Co., Ltd.); MONARCH: 700, 800, 880, 900, 1000, 1100, 1300, 1400, and 2000 (that are manufactured by Cabot); BLACK PEARLS: 880, 800, and L (that are manufactured by Cabot); COLOR BLACK: FW1, FW2, FW2V, FW18, FW200, S150, S160, and S170 (that are manufactured by Degussa); PRINTEX: 85, 95, 140U, 140V, U, and V (that are manufactured by Degussa); SPECIAL BLACK: 6, 5, 4A, and 4 (that are manufactured by Degussa); and No. 900, No. 1000, No. 2200B, No. 2300, No. 2350, No. 2400R, and MCF-88 (that are manufactured by Mitsubishi Chemical Corporation). Newly prepared carbon black may also be used.

A cyan pigment, a magenta pigment, a yellow pigment, and the like may each be used as the organic pigment. A copper phthalocyanine pigment is preferably used as the cyan pigment. Specific examples of the copper phthalocyanine pigment may include C.I. Pigment Blue 1, 2, 3, 15, 15:2, 15:3, 15:4, 16, 22, and 60. A quinacridone pigment is preferably used as the magenta pigment. Specific examples of the quinacridone pigment may include C.I. Pigment Red 5, 7, 12, 48, 48:1, 57, 112, 122, 123, 146, 168, 184, 202, and 207. An azo pigment is preferably used as the yellow pigment. Specific examples of the azo pigment may include C.I. Pigment Yellow 12, 13, 14, 16, 17, 74, 83, 93, 95, 97, 98, 114, 128, 129, 151, and 154.

A self-dispersion pigment having a hydrophilic group bonded to the surface of each pigment particle or a resin-dispersed pigment dispersed by a resin dispersant may be used as the pigment. The resin-dispersed pigment may be any one of a resin-dispersed pigment using a resin dispersant, a microcapsule pigment in which the surface of each pigment particle is covered with a resin, and a resin-bonded pigment in which an organic group containing a resin is chemically bonded to the surface of each pigment particle. Pigments different from each other in dispersion method may be used in combination, or two or more kinds of pigments may be used in combination.

The content of the pigment in the ink is preferably 0.1 mass % or more and 10.0 mass % or less, more preferably 1.0 mass % or more and 8.0 mass % or less with reference to the total mass of the ink. When the content of the pigment is less than 0.1 mass %, the optical density of an image to be recorded may be insufficient. Meanwhile, when the content of the pigment is more than 10.0 mass %, for example, the ejection stability of the ink may be insufficient.

The total of the content of the pigment in the ink and the content of resin particles to be described later therein is preferably 30 mass % or less, more preferably 20 mass % or less with reference to the total mass of the ink. When the total of the content of the pigment and the content of the resin particles is more than 30 mass %, for example, the ejection stability of the ink may be insufficient.

[Self-dispersion Pigment]

The "self-dispersion pigment" in the present invention means a pigment having at least one kind of hydrophilic group bonded directly or via another atomic group (—R—) to the surface of each pigment particle. Examples of the hydrophilic group may include —COOM, —SO$_3$M, —PO$_3$HM, and —PO$_3$M$_2$. In the formulae, "M" preferably represents a hydrogen atom, an alkali metal, ammonium, or an organic ammonium. In addition, "M" in the formulae more preferably represents an alkali metal, such as lithium, sodium, or potassium, because the ejection stability of the ink is improved. In addition, a substituent containing the hydrophilic group and the other atomic group (—R—), the substituent being bonded to the surface of a pigment particle, is preferably a group having a structure represented by —CQ(PO$_3$M$_2$)$_2$. In the formula, "Q" represents R', OR', SR', or NR'$_2$. "R'" s each independently represent a hydrogen atom, an alkyl group, an acyl group, an aralkyl group, or an aryl group. Examples of the alkyl group may include a methyl group and an ethyl group. Examples of the acyl group may include an acetyl group and a benzoyl group. The aralkyl group may be, for example, a benzyl group. Examples of the aryl group may include a phenyl group and a naphthyl group. The substituent containing the hydrophilic group and the other atomic group (—R—), the substituent being bonded to the surface of a pigment particle, is particularly preferably a group having a structure represented by —CH(PO$_3$M$_2$)$_2$.

Examples of the other atomic group (—R—) may include an amide group, an amino group, a ketone group, an ester group, an ether group, an alkylene group having 1 to 12 carbon atoms, a phenylene group, a substituted phenylene group, a naphthylene group, and a substituted naphthylene group. Of those, a group containing —C$_6$H$_4$—CONH— (benzamide structure) or —C$_6$H$_4$—SO$_2$NH— (benzenesulfonamide structure) is preferred as the other atomic group (—R—). A plurality of phosphonic acid groups may be bonded to a carbon atom of the other atomic group (—R—). Specifically, a self-dispersion pigment in which an atomic group having bonded thereto a bisphosphonic acid group or a triphosphonic acid group is bonded to the surface of each pigment particle is preferably used. With regard to the form of the hydrophilic groups in the ink, the groups may be in a state in which part of the groups are dissociated, or may be in a state in which all of the groups are dissociated.

A self-dispersion pigment that is an inorganic pigment may be, for example, a pigment (e.g., self-dispersion carbon black) obtained by introducing a hydrophilic group into the surface of each of known inorganic pigment particles, such as carbon black. Specific examples of the self-dispersion carbon black may include products available under the trade names "CAB-O-JET 200", "CAB-O-JET 300", "CAB-O-JET 352K", and "CAB-O-JET 400" (that are manufactured by Cabot).

A self-dispersion pigment that is an organic pigment may be, for example, a self-dispersion cyan pigment, a self-dispersion magenta pigment, or a self-dispersion yellow pigment obtained by introducing a hydrophilic group into the surface of each of known organic pigment particles. Specific examples of the self-dispersion cyan pigment may include products available under the trade names "CAB-O-JET 250C", "CAB-O-JET 450C", and "CAB-O-JET 554B" (that are manufactured by Cabot). Specific examples of the self-dispersion magenta pigment may include products available under the trade names "CAB-O-JET 260M", "CAB-O-JET 265M", and "CAB-O-JET 465M" (that are manufactured by Cabot). In addition, specific examples of the self-dispersion yellow pigment may include products available under the trade names "CAB-O-JET 270Y", "CAB-O-JET 470Y", and "CAB-O-JET 740Y" (that are manufactured by Cabot).

From the viewpoint of the color developability of an image to be recorded, a phosphonic acid-based self-dispersion pigment having a phosphonic acid group bonded directly or via another atomic group to the surface of each of the particles of the pigment is preferably used as the self-dispersion pigment. A plurality of phosphonic acid groups may be bonded to a carbon atom of the other atomic group (—R—). Specifically, a phosphonic acid-based self-dispersion pigment in which an atomic group having bonded thereto a bisphosphonic acid group or a triphosphonic acid group is bonded to the surface of each pigment particle is preferably used. Of such pigments, a phosphonic acid-based self-dispersion pigment in which an atomic group having bonded thereto a bisphosphonic acid group is bonded to the surface of each pigment particle is particularly preferably used because the color developability of the image to be recorded is improved.

[Method of Analyzing Pigment]

The following method may be given as an analysis method for verification as to whether or not the pigment in the ink is a self-dispersion pigment. First, the ink is subjected to acid precipitation and then centrifuged, followed by the collection of a precipitate. When the sample is a pigment dispersion, the pigment dispersion is subjected to acid precipitation and then a precipitate is collected. Next, the collected precipitate is loaded into a dish and water is poured into the dish, followed by stirring to redisperse the precipitate. After the resultant has been left to stand for 1 day, when the pigment is dispersed without the occurrence of any precipitate in the dish, the pigment can be judged to be a self-dispersion pigment.

Whether or not the self-dispersion pigment in the ink has a phosphonic acid group may be verified by analysis with an ICP emission spectrometer. Specifically, analysis is performed with the ICP emission spectrometer, and when the presence of a phosphorus element is confirmed, the self-dispersion pigment can be judged to have a phosphonic acid group.

[Resin-dispersed Pigment]

A resin dispersant that has heretofore been used in an inkjet ink may be used as the resin dispersant in the resin-dispersed pigment. The weight-average molecular weight of the resin dispersant in terms of polystyrene measured by gel permeation chromatography (GPC) is preferably 1,000 or more and 30,000 or less, more preferably 3,000 or more and 15,000 or less. The acid value of the resin dispersant is preferably 50 mgKOH/g or more and 350 mgKOH/g or less, more preferably 80 mgKOH/g or more and 250 mgKOH/g or less. The use of the resin dispersant having an acid value within the range improves the dispersion stability of the pigment and the ejection stability of the ink. The acid value of the resin dispersant may be measured by potentiometric titration.

The content (mass %) of the resin dispersant in the ink is preferably 0.1 mass % or more and 5.0 mass % or less, more preferably 0.5 mass % or more and 3.0 mass % or less with reference to the total mass of the ink. In addition, the content (mass %) of the pigment in the ink is preferably more than 3 times, more preferably 3.3 times or more, particularly preferably 4 times or more and 10 times or less in terms of a mass ratio with respect to the content (mass %) of the resin dispersant.

In addition, the content (mass %) of the pigment in the ink is preferably 0.3 times or more and 5.0 times or less, more preferably 0.5 times or more and 2.0 times or less in terms of a mass ratio with respect to the content (mass %) of the resin, such as resin particles.

The resin dispersant is preferably water-soluble. The phrase "resin is water-soluble" as used in the present invention means that when the resin is neutralized with an alkali equivalent to its acid value, the resin is brought into a state of having no particle diameter in an aqueous medium. Examples of a monomer to be used at the time of the preparation of the resin dispersant may include styrene, vinylnaphthalene, an aliphatic alcohol ester of an α,β-ethylenically unsaturated carboxylic acid, acrylic acid, methacrylic acid, maleic acid, itaconic acid, fumaric acid, vinyl acetate, vinylpyrrolidone, acrylamide, and derivatives thereof. One kind of those monomers may be used alone, or two or more kinds thereof may be used in combination. At least one of the monomers is preferably a hydrophilic monomer. At least one of acrylic acid or methacrylic acid is preferably used as the hydrophilic monomer. A copolymer having units derived from both acrylic acid and methacrylic acid is particularly preferably used as the resin dispersant. A block copolymer, a random copolymer, a graft copolymer, and salts thereof, and the like may also be used. Further, a natural resin, such as rosin, shellac, or starch, may be used as the resin dispersant.

[Method of Judging Whether or not Pigment is Dispersed by Resin Dispersant]

First, a liquid prepared by concentrating or diluting the ink so that the content of its total solid content may be about 10 mass % is provided. Next, the liquid is centrifuged at 12,000 rpm for 1 hour, and a sedimented component containing the pigment is recovered. A liquid phase contains components, such as the water-soluble organic solvent and a resin that does not contribute to the dispersion of the pigment. Then, when the recovered sedimented component contains a resin, it can be judged that the pigment is dispersed by the resin (resin dispersant). The resin incorporated as a main component into the sedimented component is a resin dispersant that contributes to the dispersion of the pigment, and the resin incorporated as a main component into the liquid phase is a resin except the resin dispersant that does not contribute to the dispersion of the pigment.

<Resin>

The ink of the present invention contains a resin. The resin is preferably incorporated in a state of resin particles into the ink from the viewpoint of the viscosity of the ink. The term "resin particles" as used in the present invention means "particles each formed of a resin that can be present in a dispersed state in an aqueous medium." Polyurethane resin particles or acrylic resin particles are preferred as the resin particles. In addition, resin particles each formed of a resin containing an ester bond in its molecular structure are preferably used.

The content of the resin in the ink is preferably 0.1 mass % or more and 15.0 mass % or less, more preferably 1.0 mass % or more and 8.0 mass % or less with reference to the total mass of the ink. When the content of the resin falls within the range, the fastness of an image and the ejection stability of the ink can be further improved.

The 50% cumulative volume-average particle diameter ($D_{50}$) of the resin particles is preferably 1 nm or more and 200 nm or less, more preferably 100 nm or more and 200 nm or less. In addition, the weight-average molecular weight of the resin particles may be measured with a polystyrene standard sample by gel permeation chromatography (GPC). For example, those described below may be used as a GPC apparatus and the like. In addition, a product available under the trade name "PS-1" or "PS-2" (manufactured by Polymer Laboratories) may be used as the polystyrene standard sample.

Apparatus: Alliance GPC 2695 (manufactured by Waters)
Column: Four continuous columns of Shodex KF-806M (manufactured by Showa Denko K.K.)
Detector: Refractive index (RI) detector

[Polyurethane Resin Particles]
[Physical Properties of Polyurethane Resin Particles]

The weight-average molecular weight of the polyurethane resin particles in terms of polystyrene measured by GPC is preferably 5,000 or more and 150,000 or less, more preferably 8,000 or more and 100,000 or less. When the weight-average molecular weight of the polyurethane resin particles falls within the range, the rubfastness of an image, the storage stability of the ink, and the ejection stability of the ink can be further improved.

The acid value of the polyurethane resin particles is preferably 100 mgKOH/g or less, more preferably 5 mgKOH/g or more and 30 mgKOH/g or less. In addition, the glass transition temperature (Tg) of each of the polyurethane resin particles is preferably −80° C. or more, more preferably −50° C. or more. In addition, the glass transition temperature (Tg) of each of the polyurethane resin particles is preferably 120° C. or less, more preferably 100° C. or less.

[Method of Producing Polyurethane Resin Particles]

The polyurethane resin particles may be produced in accordance with a method that has heretofore been generally used. A polyurethane resin may be produced in accordance with, for example, the following method. First, a polyol free of any acid group and an organic solvent, such as methyl ethyl ketone, are mixed and sufficiently stirred so that the polyol may be dissolved. After that, a polyisocyanate and a diol having an acid group are added and caused to react with the solution. Thus, a urethane prepolymer solution is obtained. Next, the resultant urethane prepolymer solution is neutralized and then ion-exchanged water is added to the neutralized product, followed by emulsification through high-speed stirring with a homomixer. After the emulsification, a chain extender is added to perform a chain extension reaction. Thus, the polyurethane resin particles can be obtained. The materials constituting the polyurethane resin particles are described below.

(1) Polyisocyanate

The polyurethane resin constituting the polyurethane resin particles typically contains a unit derived from a polyisocyanate. The term "polyisocyanate" as used in the present invention means a compound having two or more isocyanate groups. Examples of the polyisocyanate may include an aliphatic polyisocyanate, an alicyclic polyisocyanate, an aromatic polyisocyanate, and an aromatic-aliphatic polyisocyanate. The content of the unit derived from the polyisocyanate in the polyurethane resin is preferably 10.0 mass % or more and 80.0 mass % or less with reference to the entirety of the resin.

Specific examples of the aliphatic polyisocyanate may include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Specific examples of the alicyclic polyisocyanate may include isophorone diisocyanate, hydrogenated xylylene diisocyanate, dicyclohexylmethane 4,4'-diisocyanate, 1,4-cyclohexane diisocyanate, methylcyclohexylene diisocyanate, and 1,3-bis(isocyanatomethyl)cyclohexane. Specific examples of the aromatic polyisocyanate may include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Specific examples of the aromatic-aliphatic polyisocyanate may include a dialkyldiphenylmethane diisocyanate, a tetraalkyl diphenylmethane diisocyanate, and α,α,α,α-tetramethyl-xylylene diisocyanate. One kind of those polyisocyanates may be used alone, or two or more kinds thereof may be used in combination. Of those polyisocyanates, isophorone diisocyanate, hexamethylene diisocyanate, and dicyclohexylmethane 4,4'-diisocyanate are preferred.

(2) Polyol Free of any Acid Group

The polyurethane resin constituting the polyurethane resin particles preferably contains a unit derived from a polyol free of any acid group. The content of the unit derived from the polyol free of any acid group in the polyurethane resin is preferably 0.1 mass % or more and 80.0 mass % or less with reference to the entirety of the polyurethane resin.

Examples of the polyol free of any acid group may include a polyester polyol, a polyether polyol, and a polycarbonate diol. The number of carbon atoms of the polyol free of any acid group is preferably 13 or more and 250 or less. The number-average molecular weight of the polyol free of any acid group in terms of polystyrene measured by GPC is preferably 600 or more and 4,000 or less.

The polyester polyol may be, for example, an ester of an acid component with a polyalkylene glycol, a dihydric alcohol, or a trihydric or more polyhydric alcohol. Examples of the acid component may include an aromatic dicarboxylic acid, an alicyclic dicarboxylic acid, and an aliphatic dicarboxylic acid. Examples of the aromatic dicarboxylic acid may include isophthalic acid, terephthalic acid, orthophthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid. Examples of the alicyclic dicarboxylic acid may include hydrogenated products of the aromatic dicarboxylic acids described above. Examples of the aliphatic dicarboxylic acid may include malonic acid, succinic acid, tartaric acid, oxalic acid, glutaric acid, adipic acid, pimelic acid, suberic acid, azelaic acid, sebacic acid, an alkyl succinic acid, linolenic acid, maleic acid, fumaric acid, mesaconic acid, citraconic acid, and itaconic acid. In addition, each of reactive derivatives, such as acid anhydrides, alkyl esters, or acid halides, of the acid components may also be used as the acid component constituting the polyester polyol. One kind of those acid components may be used alone, or two or more kinds thereof may be used in combination.

Examples of the polyalkylene glycol may include polyethylene glycol, polypropylene glycol, polytetramethylene glycol, and an ethylene glycol-propylene glycol copolymer. Examples of the dihydric alcohol may include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trihydric or more polyhydric alcohol may include glycerin, trimethylolpropane, 1,2,5-hexanetriol, 1,2,6-hexanetriol, and pentaerythritol. One kind of those polyester polyols may be used alone, or two or more kinds thereof may be used in combination.

Examples of the polyether polyol may include addition polymers of a polyalkylene glycol and an alkylene oxide with a dihydric alcohol or a trihydric or more polyhydric alcohol. Examples of the polyalkylene glycol may include polyethylene glycol, polypropylene glycol, polytetramethylene glycol, and an ethylene glycol-propylene glycol copolymer. Examples of the dihydric alcohol may include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trihydric or more polyhydric alcohol may include glycerin, trimethylolpropane, 1,2,5-hexanetriol, 1,2,6-hexanetriol, and pentaerythritol. Examples of the alkylene oxide may include ethylene oxide, propylene oxide, butylene oxide, and an α-olefin oxide. One kind of those polyether polyols may be used alone, or two or more kinds thereof may be used in combination.

A polycarbonate diol produced by a conventionally known method may be used as the polycarbonate diol. For example, a polycarbonate diol obtained by causing a carbonate component, such as an alkylene carbonate, a diaryl carbonate, or a dialkyl carbonate, or phosgene and an aliphatic diol component to react with each other may be used. One kind of those polycarbonate diols may be used alone, or two or more kinds thereof may be used in combination.

Of the polyols each free of any acid group, a polyether polyol is preferably used. When the polyurethane resin particles produced by using the polyether polyol are used, a resin film to be formed has moderate flexibility and hence the rubfastness of an image can be further improved. In addition, the polyether polyol has relatively high hydrophilicity and hence the ejection stability of the ink can be improved. Of the polyether polyols, polypropylene glycol is particularly preferred.

(3) Diol Having Acid Group

The polyurethane resin constituting the polyurethane resin particles preferably contains a unit derived from a diol having an acid group. The term "diol having an acid group" as used in the present invention means a diol having an acid group, such as a carboxyl group, a sulfonate group, or a phosphate group. The diol having an acid group may be used in the form of a salt with an alkali metal, such as Li, Na, or K, or of a salt with an organic amine, such as ammonia or dimethylamine. Dimethylolpropionic acid or dimethylolbutanoic acid is preferably used as the diol having an acid group. One kind of those diols each having an acid group may be used alone, or two or more kinds thereof may be used in combination. The content of the unit derived from the diol having an acid group in the polyurethane resin is preferably 5.0 mass % or more and 40.0 mass % or less with reference to the entirety of the polyurethane resin.

(4) Chain Extender

A chain extender may be used at the time of the production of the polyurethane resin particles. The chain extender is a compound that can react with a remaining isocyanate group that has not formed any urethane bond out of the polyisocyanate units in the urethane prepolymer. Specific examples of the chain extender include trimethylolmelamine and derivatives thereof, dimethylol urea and derivatives thereof, dimethylolethylamine, diethanolmethylamine, dipropanolethylamine, dibutanolmethylamine, a polyvalent amine compound, such as ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, or hydrazine, polyamide polyamine, and polyethylene polyimine.

Specific examples of the chain extender may further include ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerin, trimethylolpropane, and pentaerythritol. One kind of those chain extenders may be used alone, or two or more kinds thereof may be used in combination.

[Acrylic Resin Particles]
[Physical Properties of Acrylic Resin Particles]

The weight-average molecular weight of the acrylic resin particles in terms of polystyrene measured by GPC is preferably 100,000 or more and 3,000,000 or less, more preferably 300,000 or more and 1,000,000 or less. When the weight-average molecular weight of the acrylic resin particles falls within the range, the rubfastness of an image, the storage stability of the ink, and the ejection stability of the ink can be further improved.

The acid value of the acrylic resin particles is preferably 150 mgKOH/g or less, more preferably 25 mgKOH/g or more and 140 mgKOH/g or less. The glass transition temperature (Tg) of each of the acrylic resin particles is preferably −20° C. or more, more preferably −10° C. or more, particularly preferably 25° C. or more. In addition, the glass transition temperature (Tg) of each of the acrylic resin particles is preferably 120° C. or less, more preferably 100° C. or less.

[Monomer to be Used for Acrylic Resin Particles]

An example of the monomer to be used to produce the acrylic resin constituting the acrylic resin particles is a (meth)acrylic monomer. Specific examples of the (meth) acrylic monomer may include (meth)acrylic acid alkyl esters, such as methyl (meth)acrylate, ethyl (meth)acrylate, propyl (meth)acrylate, butyl (meth)acrylate, hexyl (meth) acrylate, octyl (meth)acrylate, lauryl (meth)acrylate, and stearyl (meth)acrylate; and (meth)acrylic acids, such as acrylic acid and methacrylic acid. The acrylic resin may be a homopolymer of (meth)acrylic monomers or a copolymer of (meth)acrylic monomers with other monomers. Examples of the other monomers may include vinyl esters, olefins, styrenes, crotonic acids, itaconic acids, maleic acids, fumaric acids, acrylamides, allyl compounds, vinyl ethers, vinyl ketones, glycidyl esters, and unsaturated nitriles. When the acrylic resin is a copolymer, the content of a unit derived from a (meth)acrylic monomer in the copolymer is preferably 60 mol % or more with reference to the entirety of the copolymer. When a self-dispersion pigment is used as the pigment, resin particles each formed of a resin containing an ester bond in its molecular structure are preferably used.

(Water)

The ink of the present invention is an aqueous ink containing water. Deionized water (ion-exchanged water) is preferably used as the water. The content of the water in the ink is preferably 50 mass % or more and 90 mass % or less with reference to the total mass of the ink.

(Water-soluble Organic Solvent)

The ink of the present invention contains a water-soluble organic solvent. The term "water-soluble organic solvent" as used in the present invention means an "organic solvent having a solubility in water at 20° C. of 500 g/L or more." Any one of the known water-soluble organic solvents that may be used in inks may be used as the water-soluble organic solvent. Specific examples of the water-soluble organic solvent may include alcohols, glycols, alkylene glycols, polyethylene glycols, nitrogen-containing compounds, and sulfur-containing compounds. One kind of those water-soluble organic solvents may be used alone, or two or more kinds thereof may be used in combination. From the viewpoint of the adjustment of the viscosity of the ink, glycerin, ethylene glycol, diethylene glycol, triethylene glycol, a polyethylene glycol having a weight-average molecular weight of 10,000 or less, 1,3-propanediol, or diglycerol is preferably used. The polyethylene glycol and glycerin are each more preferably used. The number-average molecular weight of the polyethylene glycol is preferably 400 or more and 2,000 or less. The content of the water-soluble organic solvent in the ink is preferably 50 mass % or less, more preferably 5 mass % or more and 45 mass % or less with reference to the total mass of the ink.

(Surfactant)

The ink of the present invention preferably further contains a surfactant. The incorporation of the surfactant can further improve the ejection stability of the ink and the ease with which a dot of the ink spreads on a recording medium. Any one of the conventionally known surfactants may be used as the surfactant. Of those, a nonionic surfactant is preferred. Of the nonionic surfactants, ethylene oxide adducts, such as a polyoxyethylene alkyl ether and an acetylene glycol, a fluorine-based surfactant, and a silicone-based surfactant are preferred.

The content (mass %) of the surfactant in the ink is preferably 0.1 mass % or more and 3.0 mass % or less, more preferably 0.5 mass % or more and 1.5 mass % or less with reference to the total mass of the ink. When the content of the surfactant falls within the range, the ejection stability of the ink and the ease with which a dot of the ink spreads on a recording medium can be further improved.

(Additives)

The ink of the present invention may contain various additives, such as a surfactant except the above-mentioned surfactants, a pH adjustor, an external lubricant, a corrosion inhibitor, a preservative agent, a fungicide, an antioxidant, an antireducing agent, an evaporation promoter, and a chelator, as required.

An amine compound having a buffer capacity is preferably used as the pH adjustor. The amine compound having a buffer capacity may be, for example, N-butyldiethanolamine. In addition, a fluorine-based surfactant, a polyethylene wax, or the like may be used as the surface lubricant.

<Ink Cartridge>

An ink cartridge of the present invention includes an ink storage portion configured to store an ink. In addition, the ink of the present invention described above is stored in the ink storage portion. The ink storage portion may be, for example, an ink storage portion having: an ink storage chamber configured to store a liquid ink; and a negative pressure-generating member storage chamber configured to store a negative pressure-generating member configured to hold the ink in itself with a negative pressure. In addition, the ink cartridge may be an ink cartridge that does not include an ink storage chamber configured to store a liquid ink but includes an ink storage portion configured to hold the total amount of the ink with the negative pressure-generating member. Further, the ink cartridge may be an ink cartridge of a mode including the ink storage portion and a recording head.

<Image Recording Method>

An image recording method of the present invention includes an ink-applying step of applying the ink of the present invention described above to a recording medium. In addition, the image recording method of the present invention preferably further includes a conveying step of conveying the recording medium and a heating step of heating the recording medium having applied thereto the ink.

FIG. 1 is a schematic view for illustrating an example of an image recording apparatus to be used in the image recording method of the present invention. In the image recording apparatus illustrated in FIG. 1, the following mode has been illustrated: a recording medium wound in a roll shape is used and the recording medium having recorded thereon an image is wound in a roll shape again. That is, the image recording apparatus illustrated in FIG. 1 includes a recording medium-supplying unit 1, an ink-applying unit 2, a heating unit 3, and a recording medium-recovering unit 4. The recording medium-supplying unit 1 is a unit for holding and supplying the recording medium wound in a roll shape. The ink-applying unit 2 is a unit for applying the ink to the recording medium fed from the recording medium-supplying unit 1. The heating unit 3 is a unit for heating the recording medium having applied thereto the ink. In addition, the recording medium-recovering unit 4 is a unit for winding the recording medium having applied thereto the ink and having recorded thereon an image. The recording medium is conveyed by a conveying unit including a conveying member, such as a roller pair or a belt, along a conveying path illustrated by the solid line in FIG. 1, and is treated in each unit. For example, the following treatment may be performed: the recording medium wound in a roll shape by the recording medium-recovering unit 4 is supplied to another apparatus or the like, and the recording medium is cut into a desired size or bound into a book.

The speed at which the recording medium is conveyed in the conveying step is preferably 50 m/min or more, more preferably 100 m/min or more. In addition, from the viewpoint of a drying property or the like, the ejection amount of the ink per color is preferably 1.0 mg/cm$^2$ or less, more preferably 0.8 mg/cm$^2$ or less.

A moderate tension is preferably applied to the recording medium at the time of its conveyance. That is, the image recording apparatus preferably further includes a tension-applying unit for applying a tension to the recording medium. Specifically, it is sufficient that a tension-applying portion configured to apply a tension to the recording medium, a tension-adjusting portion configured to adjust the tension to be applied to the recording medium, and the like be arranged in the conveying path between the recording medium-supplying unit 1 and the recording medium-recovering unit 4. The application of the tension to the recording medium suppresses the swelling of fibers constituting the recording medium due to the water in the ink. The swelling of the fibers constituting the recording medium increases the volume of a gap between the fibers to increase the permeation rate of the ink. However, when the permeation rate of the ink increases, the ink is liable to deeply permeate in a direction perpendicular to the surface of the recording medium, and hence the optical density of the image becomes insufficient in some cases. In contrast, the application of the tension to the recording medium suppresses the swelling of the fibers constituting the recording medium, and hence can suppress a reduction in optical density of the image due to an increase in permeation rate of the ink.

The tension to be applied to the recording medium is set to preferably 20 N/m or more, more preferably 30 N/m or more, particularly preferably 40 N/m or more and 100 N/m or less. The setting of the tension to be applied to the recording medium to 20 N/m or more can more efficiently suppress the swelling of the fibers constituting the recording medium due to the water in the ink.

(Ink-applying Step)

The ink-applying step is the step of applying the ink to the recording medium. An inkjet system is preferably adopted as a system for the application of the ink to the recording medium. That is, the image recording method of the present invention is preferably an inkjet recording method. The inkjet system may be a thermal inkjet system, or may be a piezo inkjet system. The thermal inkjet system is a system involving applying thermal energy to the ink to eject the ink from an ejection orifice of a recording head. In addition, the piezo inkjet system is a system involving ejecting the ink from the ejection orifice of the recording head with a piezoelectric element. In the image recording method of the present invention, an ink containing resin particles and having a relatively high solid content concentration is used, and hence the ink is preferably applied to the recording medium by the piezo inkjet system from the viewpoint of the ejection stability of the ink.

The recording head may be a serial type recording head, or may be a full-line type recording head. The serial type recording head is a recording head configured to scan a recording medium in a direction intersecting its conveying direction to record an image. In addition, the full-line type recording head is a recording head having a plurality of nozzles arrayed in a range covering the maximum width of the recording medium. The full-line type inkjet recording head is preferably used because an image can be recorded at higher speed. The full-line type inkjet recording head is preferably a recording head having a nozzle train arrayed in a direction perpendicular to the conveying direction of the recording medium. In addition, it is typically preferred that a plurality of full-line type inkjet recording heads be arranged for each ink color, and the respective recording heads be sequentially arrayed along the conveying direction of the recording medium so as to be parallel to each other.

(Heating Step)

The heating step is the step of performing heating so that the surface temperature of the recording medium having applied thereto the ink may be 70° C. or more. The expression "surface temperature of the recording medium having applied thereto the ink" as used in the present invention means the surface temperature of the recording medium at a position defined as follows: when the time point at which the ink is applied to the recording medium is defined as 0 seconds, a temperature at a position distant from the application position by a distance corresponding to 0.5 second of its conveyance is measured. For example, it is hypothesized that the speed at which the recording medium is conveyed is "V" m/min. When such hypothesis is formed, it is sufficient to measure the surface temperature of an ink application region X in the recording medium at a position distant from the position at which the ink has been applied along its conveying direction by the movement distance of the application region X, i.e., "(V×0.5)/60" m. The term "position at which the ink has been applied" in the case of the full-line type inkjet recording head means a position directly below the recording head. In each of Examples to be described later, the surface temperature of a recording medium was measured with a noncontact infrared thermometer digital radiation temperature sensor (trade name "FT-H20", manufactured by Keyence Corporation) from a position distant from the surface of the recording medium in a generally vertical direction by 10 cm.

In the heating step, the heating is preferably performed so that the surface temperature of the recording medium having applied thereto the ink may be 80° C. or more. In addition, from the viewpoint of the prevention of the deformation of the recording medium due to heat, the heating is preferably performed so that the surface temperature may be 140° C. or less. Examples of a method of heating the recording medium may include: a method involving arranging a heater to heat the recording medium from its front surface side (side on which the ink is to be applied); a method involving heating the recording medium from its rear surface side; and a method involving heating both surfaces of the recording medium.

The recording medium may be continuously heated during a time period from a time point before the application of the ink to that after the application. Before the application of the ink, it is preferred that the recording medium be not heated or be heated so as to have a surface temperature of less than 70° C., it is more preferred that the recording medium be heated so as to have a surface temperature of 60°

C. or less, and it is particularly preferred that the recording medium be heated so as to have a surface temperature of 40° C. or less.

When the recording medium is heated, the recording medium may be pressurized with, for example, a pressure roller. The pressurization of the recording medium can improve the fixability of an image. When the recording medium is pressurized, there is no need to perform the pressurization over the entire process of the heating step, and the pressurization may be performed only in part of the process of the heating step. In addition, the recording medium may be pressurized in many stages, or the image recording method may further include a pressurizing step after the heating step.

(Recording Medium)

Figure 2:
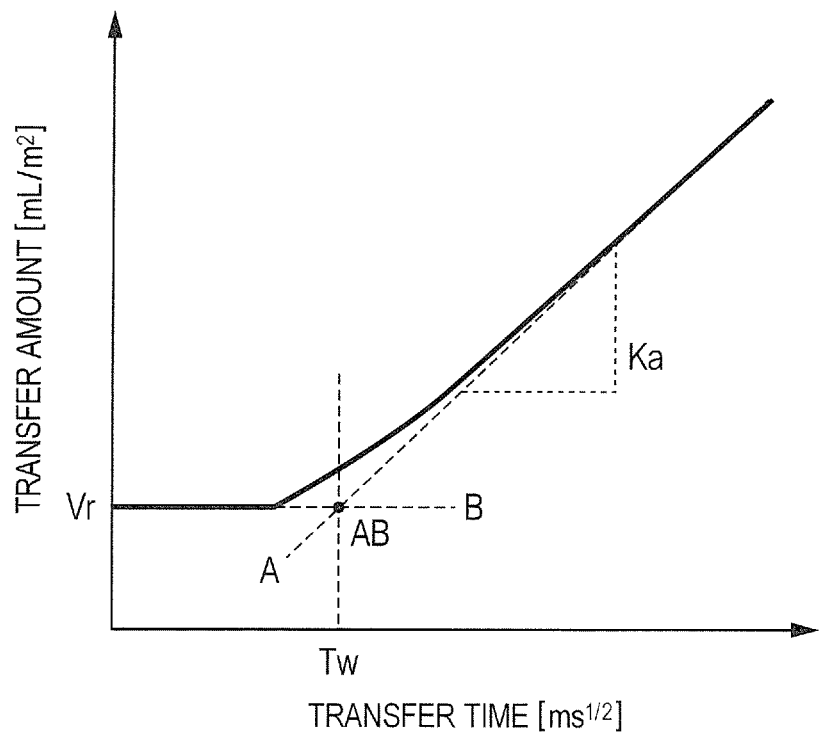
FIG. 2 is a graph for showing an example of an absorption curve describing an absorption coefficient Ka of a recording medium for water.

Any one of the recording media that have heretofore been generally used may be used as the recording medium. Of those, a recording medium having an absorption coefficient Ka for water of 0.1 mL/(m$^2$·ms$^{1/2}$) or more is preferred, a recording medium having an absorption coefficient Ka for water of 0.2 mL/(m$^2$·ms$^{1/2}$) or more is more preferred, and a recording medium having an absorption coefficient Ka for water of 0.3 mL/(m$^2$·ms$^{1/2}$) or more is particularly preferred. The Bristow method described in the "Method of testing Paper and Paperboard for their Liquid-absorbing Properties" of JAPAN TAPPI Paper Pulp Test Method No. 51 is used as a method of deriving the absorption coefficient Ka of the recording medium for water. Although detailed description about the Bristow method is omitted because many commercial books each describe the method, the absorption coefficient Ka (mL/(m$^2$·ms$^{1/2}$)) is defined by a wetting time Tw and a roughness index Vr (mL/m$^2$). FIG. 2 is a graph for showing an example of an absorption curve describing the absorption coefficient Ka of the recording medium for water. The absorption curve shown in FIG. 2 is based on the following permeation model: the permeation of a liquid into a recording medium starts after a lapse of the wetting time Tw from the contact of the liquid with the recording medium. The gradient of a straight line after a lapse of the wetting time Tw is the absorption coefficient Ka. The absorption coefficient Ka corresponds to the rate at which the liquid permeates into the recording medium. As shown in FIG. 2, the wetting time Tw is calculated as follows: a point of intersection AB of an approximate straight line A based on a least-squares method for calculating the absorption coefficient Ka, and a straight line B corresponding to "V=Vr" represented by a transfer amount V of the liquid and the roughness index Vr is determined, and a time from the origin to the point of intersection AB is defined as the wetting time. The temperature of the liquid (water) to be caused to permeate into the recording medium is set to 25° C. That is, the absorption coefficient Ka for water in the present invention is the absorption coefficient Ka for water at 25° C.

A recording medium having a mineral, such as kaolin or talc, or a filler, such as calcium carbonate, titanium dioxide, or silica, applied to its surface for the purpose of increasing its whiteness or opacity is preferably used as the recording medium. Of those, calcium carbonate is preferred because calcium carbonate has a whiteness higher than those of kaolin and talc, and is less expensive than titanium dioxide, silica, and the like. The content of calcium in the recording medium to be used in the image recording method of the present invention is preferably 1 mass % or more and 5 mass % or less with reference to the total of all elements except hydrogen.

The recording medium may be a recording medium cut into a desired size in advance, or may be an elongated recording medium wound in a roll shape, the recording medium being cut into a desired size after image recording. Of those, the elongated recording medium wound in a roll shape is preferably used because a tension can be easily applied thereto.

According to one aspect of the present invention, there can be provided an ink that can record an image excellent in color developability irrespective of whether the ink is used before or after high-temperature storage. According to another aspect of the present invention, there can be provided an ink cartridge and an image recording method each using the ink.

EXAMPLE

The present invention is more specifically described below by way of Examples and Comparative Examples. The present invention is by no means limited to Examples below without departing from the gist of the present invention. "Part(s)" and "%" with regard to the description of the amounts of components are by mass, unless otherwise stated.

<Preparation of Pigment Dispersion>

(Self-dispersion Pigment Liquid 1 (SDP1))

20.0 Grams of Pigment Yellow 74, 7.0 mmol of a sodium salt of ((4-aminobenzoylamino)-methane-1,1-diyl)bisphosphonic acid, 20.0 mmol of nitric acid, and 200.0 mL of pure water were mixed. The contents were mixed with a Silverson mixer at room temperature and 6,000 rpm for 30 minutes to provide a mixture. 20.0 mmoles of sodium nitrite dissolved in a small amount of water was slowly added to the resultant mixture. The temperature of the mixture reached 60° C. as a result of the mixing of sodium nitrite, and the mixture was subjected to a reaction in the state for 1 hour. After that, an aqueous solution of sodium hydroxide was added to adjust the pH of the mixture to 10. 30 Minutes after that, 20.0 mL of pure water was added to the mixture, and the mixture was subjected to diafiltration with a spectrum membrane. After that, the concentration of its pigment solid content was adjusted. Thus, a self-dispersion pigment dispersion liquid 1 (SDP1) having a pigment content of 15.0% was obtained. The SDP1 contained a self-dispersion pigment in which a ((4-aminobenzoylamino)-methane-1,1-diyl) bisphosphonic acid group whose counter ion was sodium was bonded to the surface of each pigment particle.

(Resin-dispersed Pigment Liquid 1 (RDP1))

A 500-milliliter recovery flask with a mechanical stirring apparatus was loaded into the tank of an ultrasonic generator. 2.5 Grams of a vinyl resin (acid value: 80 mgKOH/g) and 120 mL of tetrahydrofuran were loaded into the recovery flask, and the contents were stirred while an ultrasonic wave was applied thereto. In addition, 10 g of Pigment Yellow 74 and 120 mL of tetrahydrofuran were loaded into another container. The contents were mixed with a planetary stirring machine (manufactured by Kurabo Industries Ltd.) until the surfaces of pigment particles were sufficiently wet with the solvent. After that, the contents were added to the recovery flask, followed by mixing. An aqueous solution of potassium hydroxide was dropped and injected into the mixture to perform phase inversion until the neutralization index of the vinyl resin became 100%, and then premixing was performed for 60 minutes. After that, the resultant was dispersed with an atomization apparatus (trade name "NANOMIZER NM2-L200AR", manufactured by Yoshida Kikai Co., Ltd.) for 2 hours to provide a dispersion liquid.

Tetrahydrofuran was removed from the resultant dispersion liquid by distillation with a rotary evaporator, and the concentration of the residue was adjusted. Thus, a resin-dispersed pigment liquid 1 (RDP1) having a pigment content of 15% was obtained.

(Resin-dispersed Pigment Liquid 2 (RDP2))

A resin-dispersed pigment liquid 2 (RDP2) having a pigment content of 15% was obtained in the same manner as in the case of the RDP1 except that the amount of the vinyl resin was changed to 10 g.

<Preparation of Resin>

(Acrylic Resin Particles 1 (ACP1))

A monomer mixture containing 100 parts of ethyl acrylate, 9 parts of methyl methacrylate, 5 parts of ethyl methacrylate, 0.5 part of acrylic acid, and 0.5 part of methacrylic acid was prepared. 40 Parts of water and 0.4 part of sodium persulfate serving as a polymerization initiator were loaded into a flask with a stirring apparatus, a temperature controller, and a reflux condenser, and the temperature of the mixture was increased to 70° C. 115 Parts of the monomer mixture, 0.02 part of n-butyl mercaptan serving as a molecular weight modifier, 1 part of sodium dodecylbenzenesulfonate serving as an emulsifying agent, and 60 parts of water were added to the flask, and the contents were stirred and emulsified to prepare a pre-emulsion. The prepared pre-emulsion was removed from the flask. The total amount of the removed pre-emulsion was continuously supplied to another flask whose temperature had been controlled to 80° C. and stirred over 3 hours. After that, the pre-emulsion was stirred at 80° C. for 2 hours and a half to be subjected to a polymerization reaction. Thus, a dispersion liquid having a solid content concentration of 40%, the dispersion liquid containing acrylic resin particles 1 (ACP1), was obtained. The number-average particle diameter of the ACP1 in the resultant dispersion liquid was 80 nm.

(Acrylic Resin Particles 2 (ACP2))

A dispersion liquid having a solid content concentration of 40%, the dispersion liquid containing acrylic resin particles 2 (ACP2), was obtained in the same manner as in the case of the ACP1 except that 2-ethylhexyl acrylate was used instead of ethyl acrylate. The number-average particle diameter of the ACP2 in the resultant dispersion liquid was 120 nm.

(Acrylic Resin Particles 3 (ACP3))

A dispersion liquid having a solid content concentration of 40%, the dispersion liquid containing acrylic resin particles 3 (ACP3), was obtained in the same manner as in the case of the ACP1 except that 50 parts of methyl acrylate, 50 parts of ethyl acrylate, 10 parts of butyl methacrylate, 4 parts of methyl methacrylate, 0.5 part of acrylic acid, and 0.5 part of methacrylic acid were used as monomers. The number-average particle diameter of the ACP3 in the resultant dispersion liquid was 100 nm.

(Acrylic Resin Particles 4 (ACP4))

10 Parts of styrene, 54 parts of n-butyl acrylate, 24 parts of methyl methacrylate, 53 parts of 2-ethylhexyl acrylate, and 100 g of distilled water were loaded into a 300-milliliter four-necked flask. A stirring seal, a stirring rod, a reflux condenser, a septum rubber, and a nitrogen-introducing tube were mounted to the flask, and in a thermostat at 70° C., the flask was purged with nitrogen for 1 hour while the contents were stirred at 300 rpm. Potassium persulfate (manufactured by Sigma-Aldrich) dissolved in 100 g of distilled water was injected into the flask with a syringe, and polymerization was performed while a polymerization status was monitored by gel permeation chromatography and NMR. Thus, a polymerization reaction product was obtained. The resultant polymerization reaction product was centrifuged and then redispersed in distilled water. The centrifuging and redispersing step was repeated to purify resin particles. After that, concentration was performed with an evaporator. Thus, a dispersion liquid having a solid content concentration of 40%, the dispersion liquid containing acrylic resin particles 4 (ACP4), was obtained. The number-average particle diameter of the ACP4 in the resultant dispersion liquid was 74 nm.

(Acrylic Resin Particles 5 (ACP5))

A dispersion liquid having a solid content concentration of 40%, the dispersion liquid containing acrylic resin particles 5 (ACP5), was obtained in the same manner as in the case of the ACP4 except that: a 500-milliliter four-necked flask was used; and 100 parts of styrene, 54 parts of n-butyl acrylate, 24 parts of butyl methacrylate, 53 parts of 2-ethyihexyl acrylate, and 200 g of distilled water were used. The number-average particle diameter of the ACP5 in the resultant dispersion liquid was 111 nm.

(Acrylic Resin Particles 6 (ACP6))

A dispersion liquid having a solid content concentration of 40%, the dispersion liquid containing acrylic resin particles 6 (ACP6), was obtained in the same manner as in the case of the ACP4 except that: a 500-milliliter four-necked flask was used; and 80 parts of α-methylstyrene, 50 parts of n-butyl acrylate, 34 parts of ethyl methacrylate, 60 parts of 2-ethylhexyl acrylate, and 200 g of distilled water were used. The number-average particle diameter of the ACP6 in the resultant dispersion liquid was 121 nm.

(Urethane Resin Particles 1 to 3 (PU-1 to 3))

Urethane resin particles were prepared with reference to the description of Examples of Japanese Patent Application Laid-Open No. 2013-527267 in accordance with the following procedure.

[Prepolymer-synthesizing Step]

Respective components whose kinds and amounts were shown in Table 1, and one droplet of a catalyst were subjected to a reaction under the blanket of dry nitrogen for 1.5 hours while being mixed at from 93° C. to 99° C. A product available under the trade name "FASCAT (trademark) 2003" (2-ethylhexanoic acid and stannous octanoate, manufactured by PMC ORGANOMETALLICS) was used as the catalyst. After the reaction, a solvent (NMP) and an acid (DMPA) were loaded into the reactor, and the contents were further subjected to a reaction for 1 hour so that a ratio "NCO:OH" (molar ratio) became 2:1. Thus, each of prepolymers 1 to 3 was obtained. The amount of the remaining isocyanate (NCO) in each of the prepolymers was determined by titration with dibutylamine (DBA) and 1 M HCl. The resultant mixture was cooled to 54° C. and a neutralizer was loaded into the mixture. After the contents had been mixed for 15 minutes, each of the prepolymers was dispersed in water by the following prepolymer-dispersing step. The meanings of abbreviations in Table 1 are described below.

"H12MDI": 1,1'-methylenebis(4-isocyanatocyclohexane) (Desmodur W, manufactured by Bayer Corporation)

"HNA": polyester diol obtained from 1,6-hexanediol, neopentyl glycol, and adipic acid "DMPA" dimethylolpropionic acid "NMP": 1-methyl-2-pyrrolidone "TEA": triethylamine

TABLE 1

| Amount (parts) | Prepolymer 1 | Prepolymer 2 | Prepolymer 3 |
|---|---|---|---|
| H12MDI | 39 | 31 | 44.8 |
| HNA | 57 | 59 | 50.2 |
| DMPA | 4 | 4 | 4.9 |
| NMP | 18 | 10 | 23 |
| TEA | 2.6 | 2.6 | 4.1 |

[Prepolymer-dispersing Step and Urethane Resin Particle-producing Step]

Under a room temperature condition, a prepolymer whose amount was shown in Table 2 was loaded into deionized water while being mixed therewith for about 10 minutes. Thus, an NCO-terminated polyurethane prepolymer was formed. After the deionized water and the formed prepolymer had been mixed for 20 minutes, an aqueous solution of hydrazine (Hdy) whose amount was shown in Table 2 was added as an extender to the mixture. Thus, a dispersion liquid containing any one of urethane resin particles 1 to 3 (PU-1 to 3) was obtained.

TABLE 2

| Amount (g) | PU-1 | PU-2 | PU-3 |
|---|---|---|---|
| Prepolymer 1 | 600 | | |
| Prepolymer 2 | | 600 | |
| Prepolymer 3 | | | 600 |
| Water | 748.5 | 915 | 763 |
| Hdy | 26.3 | 28.9 | 31.7 |

(Urethane Resin Particles 4 (PU-4))

A four-necked flask with a reflux condenser, a nitrogen-introducing tube, a temperature gauge, and a stirring machine was prepared. 170 Grams of isophorone diisocyanate (manufactured by Bayer), 310 g of polyethylene glycol (Kishida Chemical Co., Ltd., number-average molecular weight: 1,000), 72 g of dimethylolpropionic acid (manufactured by Nippon Kasei Chemical Co., Ltd.), and 250 g of acetonitrile were loaded into the flask. Under a nitrogen atmosphere, the temperature of a reaction liquid was adjusted to 75° C., stannous octylate (manufactured by API Corporation) was added in a very small amount as a reaction catalyst to the liquid, and the mixture was subjected to a reaction for 6 hours until a reaction ratio of 99% or more was obtained. After the resultant had been cooled to 40° C., 59.5 g of triethylamine was added to the resultant, and the mixture was sufficiently stirred to be neutralized. 650 Grams of water was added to the neutralized product, and the mixture was stirred. After that, acetonitrile and part of the water were removed under reduced pressure. Thus, a dispersion liquid having a solid content concentration of 30%, the dispersion liquid containing urethane resin particles 4 (PU-4), was obtained. The weight-average molecular weight of a urethane resin constituting the PU-4 was 10,000.

<Preparation of Ink>

Respective components were mixed so as to have amounts (%) shown in Tables 3-1 to 3-3 and 4. Water was added so that the total amount became 100%. The mixture was sufficiently stirred to be dispersed, and was then filtered with a glass filter (trade name "AP20", manufactured by Merck Millipore Corporation). Thus, respective inks (inks 1 to 44) were prepared. The "amount (%) of a pigment" and the "amount (%) of a resin" in Tables 3-1 to 3-3 and 4 mean the "amount (%) of the solid content of the pigment" and the "amount (%) of the solid content of the resin" in an ink, respectively. Abbreviations in Tables 3-1 to 3-3 and 4 are as described below.

[Pigment]
"COJ400K": self-dispersion black pigment, trade name "CAB-O-JET 400" (manufactured by Cabot)
"COJ450C": self-dispersion cyan pigment, trade name "CAB-O-JET 450C" (manufactured by Cabot)
"COJ465M": self-dispersion magenta pigment, trade name "CAB-O-JET 465M" (manufactured by Cabot)
"COJ480V": self-dispersion magenta pigment, trade name "CAB-O-JET 480V" (manufactured by Cabot)
"COJ470Y": self-dispersion yellow pigment, trade name "CAB-O-JET 470Y" (manufactured by Cabot)
"COJ270Y": self-dispersion black pigment, trade name "CAB-0-JET 270Y" (manufactured by Cabot)

[Resin]
"AC-2714": acrylic resin particles (manufactured by Alberdingk Boley GmbH)
"MAC34": acrylic resin particles (manufactured by Alberdingk Boley GmbH)
"APU10610": acrylic/polyester/polycarbonate/polyurethane resin particles (manufactured by Alberdingk Boley GmbH)
"U199VP": polyester polyurethane resin particles (manufactured by Alberdingk Boley GmbH)
"U4000VP": aliphatic polyurethane resin particles (manufactured by Alberdingk Boley GmbH)
"CR728": acrylic resin particles (manufactured by The Lubrizol Corporation)
"JC532J": acrylic-styrene resin particles (manufactured by BASF)
"A662": acrylic-styrene resin particles (manufactured by DSM)
"R4000": polyurethane resin particles (manufactured by DSM)

[Water-soluble Organic Solvent]
"Gly": glycerin
"DEG": diethylene glycol
"2-Py": 2-pyrrolidone
"PEG400": polyethylene glycol (number-average molecular weight: 400)
"PEG800": polyethylene glycol (number-average molecular weight: 800)
"1,3-PD": 1,3-propanediol
"TEG": triethylene glycol
"1,2-HD": 1,2-hexanediol

[Surfactant]
"AE100": trade name "ACETYLENOL E100" (manufactured by Kawaken Fine Chemicals Co., Ltd.)
"AE60": trade name "ACETYLENOL E60" (manufactured by Kawaken Fine Chemicals Co., Ltd.)
"AE40": trade name "ACETYLENOL E40" (manufactured by Kawaken Fine Chemicals Co., Ltd.)
"D800": trade name "Dynol 800" (manufactured by Air Products and Chemicals, Inc.)
"D604": trade name "Dynol 604" (manufactured by Air Products and Chemicals, Inc.)
"E104P": trade name "EMULGEN 104P" (manufactured by Kao Corporation)
"F444": trade name "MEGAFACE F-444" (manufactured by DIC Corporation)

[Additives]
"KHCO$_3$": anhydrous potassium bicarbonate
"FS-64": ionic fluorine-based surfactant (manufactured by DuPont)

"WAX": PE wax emulsion (trade name "AQUACER 531", manufactured by BYK)

<Measurement of Rate of Aggregation>

Figure 3:
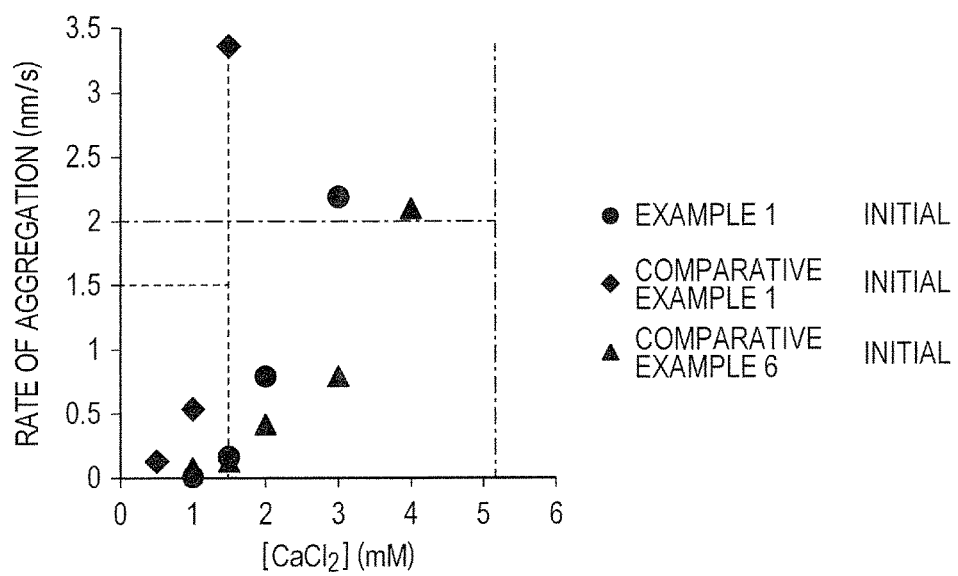
FIG. 3 is a graph for showing a relationship between a calcium chloride concentration and a rate of aggregation measured with each of the inks before stored at 60° C. for 2 weeks (initial) of Example 1, Comparative Example 1, and Comparative Example 6.
Figure 4:
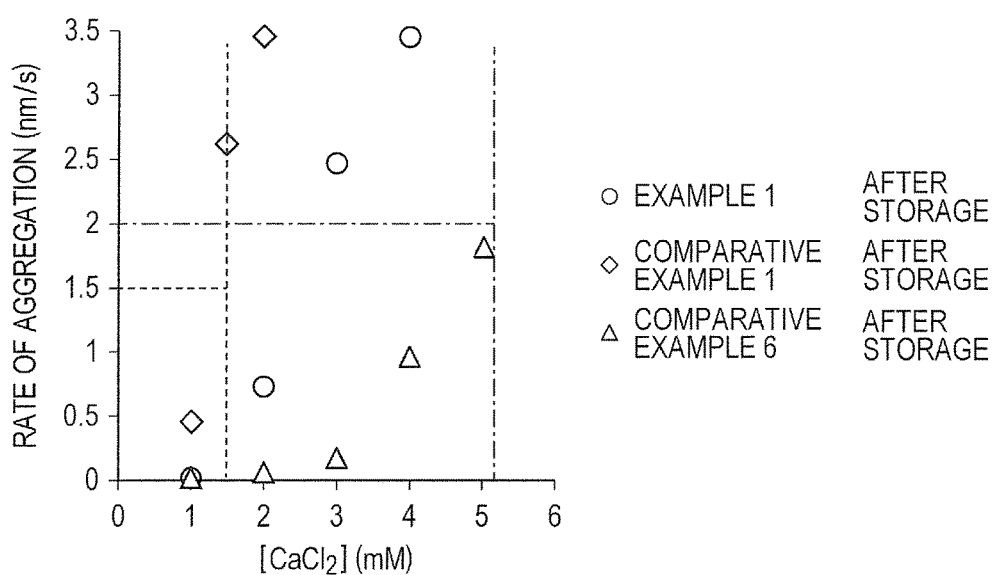
FIG. 4 is a graph for showing a relationship between a calcium chloride concentration and a rate of aggregation measured with each of the inks after stored at 60° C. for 2 weeks of Example 1, Comparative Example 1, and Comparative Example 6.

The rate of aggregation (rate of aggregation (1)) of a solid content in a first liquid and the rate of aggregation (rate of aggregation (2)) of a solid content in a second liquid, the liquids being prepared by using inks before and after high-temperature storage, were measured in accordance with the "Method of measuring Rate of Aggregation." That is, a calcium chloride solution was added in such an amount as to have a predetermined concentration to an ink diluted 500-fold, followed by mixing. Immediately after the mixing, the measurement of a pigment particle diameter was started. The pigment particle diameter was measured at an interval of 2 seconds for 900 seconds. In addition, a concentrated type particle diameter analyzer (trade name "FPAR-1000", manufactured by Otsuka Electronics Co., Ltd.) was used as an apparatus for measuring the pigment particle diameter. After the completion of the measurement, the initial gradient of a change in particle diameter was determined, and was defined as a rate of aggregation. The rate of aggregation (1) (nm/second) and the rate of aggregation (2) (nm/second) thus measured are shown in Tables 3-1 to 3-3 and 4. The term "aggregation" described in the column of the rate of aggregation (2) of each of Comparative Examples 10 and 12 of Table 4 means that in a state after the storage of an ink at 60° C. for 2 weeks, precipitation due to a solid content in the ink occurred, and hence the rate of aggregation could not be measured. In addition, FIG. 3 is a graph for showing a relationship between a calcium chloride concentration and a rate of aggregation measured with each of the inks before stored at 60° C. for 2 weeks (initial) of Example 1, Comparative Example 1, and Comparative Example 6. FIG. 4 is a graph for showing a relationship between a calcium chloride concentration and a rate of aggregation measured with each of the inks after stored at 60° C. for 2 weeks of Example 1, Comparative Example 1, and Comparative Example 6.

TABLE 3-1

| | | Composition of ink | | | | | | | | | | | |
|---|---|---|---|---|---|---|---|---|---|---|---|---|---|
| | | Example | | | | | | | | | | | |
| | | 1 | 2 | 3 | 4 | 5 | 6 | 7 | 8 | 9 | 10 | 11 | 12 |
| | | Ink | | | | | | | | | | | |
| | | 1 | 2 | 3 | 4 | 5 | 6 | 7 | 8 | 9 | 10 | 11 | 12 |
| Pigment | SDP1 | 5 | 7 | 5 | 5 | 5 | 5 | 5 | 5 | 5 | 5 | 5 | 5 |
| | COJ400K | | | | | | | | | | | | |
| | COJ450C | | | | | | | | | | | | |
| | COJ465M | | | | | | | | | | | | |
| | COJ480V | | | | | | | | | | | | |
| | COJ470Y | | | | | | | | | | | | |
| | COJ270Y | | | | | | | | | | | | |
| | RDP1 | | | | | | | | | | | | |
| Resin | ACP1 | 5 | 5 | 5 | 5 | 5 | 5 | 5 | 5 | 5 | 8 | | |
| | ACP2 | | | | | | | | | | | 5 | |
| | ACP3 | | | | | | | | | | | | 5 |
| | ACP4 | | | | | | | | | | | | |
| | PU-1 | | | | | | | | | | | | |
| | PU-2 | | | | | | | | | | | | |
| | PU-3 | | | | | | | | | | | | |
| | AC-2714 | | | | | | | | | | | | |
| | MAC34 | | | | | | | | | | | | |
| | APU10610 | | | | | | | | | | | | |
| | U199VP | | | | | | | | | | | | |
| | U4000VP | | | | | | | | | | | | |
| | CR728 | | | | | | | | | | | | |
| Water-soluble organic solvent | Gly | 15 | 15 | 20 | 20 | 20 | 15 | 15 | 15 | 15 | 15 | 15 | 15 |
| | DEG | 5 | 5 | | | | 5 | 5 | 5 | 5 | 5 | | 5 |
| | 2-Py | | | | | | | | | | | 5 | |
| | PEG400 | | | 10 | | | | | | | | | |
| | PEG800 | 6 | 3 | | | | 6 | 6 | 6 | 6 | 3 | 6 | 6 |
| | 1,3-PD | | | | 7 | | | | | | | | |
| | TEG | | | | | 6 | | | | | | | |
| | 1,2-HD | | | | | | | | | | | 1 | 1 |
| Surfactant | AE100 | 1 | | | | | | | | 1 | | | |
| | AE60 | | | | | | | | | | | 1 | |
| | AE40 | | | | | | | | | | | | 1 |
| | D800 | | 1 | | | | | 1 | 1 | | | | |
| | D604 | | | 1 | 1 | 1 | | | | | | | |
| | E104P | | | | | | 1 | | | | | | |
| | F444 | | | | | | | | 1 | | | | |
| Additive | KHCO₃ | | | | | | | | | | | | |
| | FS-64 | | | | | | | | | 0.1 | | | |
| | WAX | | | | | | | | | | 0.5 | | |
| Main medium | Water | Balance | Balance | Balance | Balance | Balance | Balance | Balance | Balance | Balance | Balance | Balance | Balance |
| Rate of aggregation (1) (nm/second) | | <0.1 | <0.1 | <0.1 | <0.1 | <0.1 | <0.1 | <0.1 | <0.1 | <0.1 | <0.1 | <0.1 | <0.1 |
| Rate of aggregation (2) (nm/second) | | >3.0 | >3.0 | >3.0 | >3.0 | >3.0 | >3.0 | >3.0 | >3.0 | >3.0 | >3.0 | >3.0 | >3.0 |

TABLE 3-2

| | | Composition of ink | | | | | | | | | | | |
|---|---|---|---|---|---|---|---|---|---|---|---|---|---|
| | | Example | | | | | | | | | | | |
| | | 13 | 14 | 15 | 16 | 17 | 18 | 19 | 20 | 21 | 22 | 23 | 24 |
| | | Ink | | | | | | | | | | | |
| | | 13 | 14 | 15 | 16 | 17 | 18 | 19 | 20 | 21 | 22 | 23 | 24 |
| Pigment | SDP1 | 5 | 5 | 5 | 5 | 5 | 5 | 5 | 5 | 5 | 5 | | |
| | COJ400K | | | | | | | | | | | 5 | |
| | COJ450C | | | | | | | | | | | | 5 |
| | COJ465M | | | | | | | | | | | | |
| | COJ480V | | | | | | | | | | | | |
| | COJ470Y | | | | | | | | | | | | |
| | COJ270Y | | | | | | | | | | | | |
| | RDP1 | | | | | | | | | | | | |
| Resin | ACP1 | | | | | | | | | | | 5 | 5 |
| | ACP2 | | | | | | | | | | | | |
| | ACP3 | | | | | | | | | | | | |
| | ACP4 | 5 | | | | | | | | | | | |
| | PU-1 | | 5 | | | | | | | | | | |
| | PU-2 | | | 5 | | | | | | | | | |
| | PU-3 | | | | 5 | | | | | | | | |
| | AC-2714 | | | | | 5 | | | | | | | |
| | MAC34 | | | | | | 5 | | | | | | |
| | APU10610 | | | | | | | 5 | | | | | |
| | U199VP | | | | | | | | 5 | | | | |
| | U4000VP | | | | | | | | | 5 | | | |
| | CR728 | | | | | | | | | | 5 | | |
| Water-soluble organic solvent | Gly | 15 | 15 | 15 | 15 | 15 | 15 | 15 | 15 | 15 | 15 | 15 | 15 |
| | DEG | 5 | 5 | 5 | 5 | 5 | 5 | 5 | 5 | 5 | 5 | 5 | 5 |
| | 2-Py | | | | | | | | | | | | |
| | PEG400 | | | | | | | | | | | | |
| | PEG800 | 6 | 6 | 6 | 6 | 6 | 6 | 6 | 6 | 6 | 6 | 6 | 6 |
| | 1,3-PD | | | | | | | | | | | | |
| | TEG | | | | | | | | | | | | |
| | 1,2-HD | | | | | | | | | | | | |
| Surfactant | AE100 | | | | | | | | | | | 1 | 1 |
| | AE60 | | | | | | | | | | | | |
| | AE40 | | | | | | | | | | | | |
| | D800 | 1 | | | | | | | | | | | |
| | D604 | | 1 | 1 | 1 | 1 | 1 | 1 | 1 | 1 | 1 | | |
| | E104P | | | | | | | | | | | | |
| | F444 | | | | | | | | | | | | |
| Additive | KHCO$_3$ | | | | | | | | | | | | |
| | FS-64 | | | | | | | | | | | | |
| | WAX | | | | | | | | | | | | |
| Main medium | Water | Balance | Balance | Balance | Balance | Balance | Balance | Balance | Balance | Balance | Balance | Balance | Balance |
| Rate of aggregation (1) (nm/second) | | <0.1 | <0.1 | <0.1 | <0.1 | <0.1 | <0.1 | <0.1 | <0.1 | <0.1 | <0.1 | <0.1 | <0.1 |
| Rate of aggregation (2) (nm/second) | | 2.8 | 2.6 | 2.1 | 2.4 | >3.0 | >3.0 | >3.0 | >3.0 | >3.0 | >3.0 | >3.0 | >3.0 |

TABLE 3-3

| | | Composition of ink | | | | | | | |
|---|---|---|---|---|---|---|---|---|---|
| | | Example | | | | | | | |
| | | 25 | 26 | 27 | 28 | 29 | 30 | 31 | 32 |
| | | Ink | | | | | | | |
| | | 25 | 26 | 27 | 28 | 29 | 30 | 31 | 32 |
| Pigment | SDP1 | | | | | | | | |
| | COJ400K | | | | | | | | |
| | COJ450C | | | | | | | | |
| | COJ465M | 5 | | | | | | | |
| | COJ480V | | 5 | | | | | | |
| | COJ470Y | | | 5 | | | | | |
| | COJ270Y | | | | 10 | 6 | | | 5 |
| | RDP1 | | | | | | 10 | 6 | 5 |
| Resin | ACP1 | 5 | 5 | 5 | 1 | 1 | 3 | 3 | |
| | ACP2 | | | | | | | | 3 |

TABLE 3-3-continued

| | | Composition of ink | | | | | | | |
|---|---|---|---|---|---|---|---|---|---|
| | | Example | | | | | | | |
| | | 25 | 26 | 27 | 28 | 29 | 30 | 31 | 32 |
| | | Ink | | | | | | | |
| | | 25 | 26 | 27 | 28 | 29 | 30 | 31 | 32 |
| | ACP3 | | | | | | | | |
| | ACP4 | | | | | | | | |
| | PU-1 | | | | | | | | |
| | PU-2 | | | | | | | | |
| | PU-3 | | | | | | | | |
| | AC-2714 | | | | | | | | |
| | MAC34 | | | | | | | | |
| | APU10610 | | | | | | | | |
| | U199VP | | | | | | | | |
| | U4000VP | | | | | | | | |
| | CR728 | | | | | | | | |
| Water-soluble organic solvent | Gly | 15 | 15 | 15 | 10 | 10 | 10 | 10 | 10 |
| | DEG | 5 | 5 | 5 | | | 3 | | |
| | 2-Py | | | | 2 | 2 | | 5 | 5 |
| | PEG400 | | | | | | | | |
| | PEG800 | 6 | 6 | 6 | 3 | 5 | 3 | 3 | 3 |
| | 1,3-PD | | | | | | | | |
| | TEG | | | | | | | | |
| | 1,2-HD | | | | | | | | |
| Surfactant | AE100 | 1 | 1 | 1 | 1 | | | | |
| | AE60 | | | | | | 1 | | |
| | AE40 | | | | | | | | |
| | D800 | | | | | | | | |
| | D604 | | | | | 1 | | 1 | 1 |
| | E104P | | | | | | | | |
| | F444 | | | | | | | | |
| Additive | KHCO$_3$ | | | | | 5 | | 5 | |
| | FS-64 | | | | | | | | |
| | WAX | | | | | | | | |
| Main medium | Water | Balance | Balance | Balance | Balance | Balance | Balance | Balance | Balance |
| Rate of aggregation (1) (nm/second) | | <0.1 | <0.1 | <0.1 | <0.1 | <0.1 | <0.1 | <0.1 | <0.1 |
| Rate of aggregation (2) (nm/second) | | >3.0 | >3.0 | >3.0 | 2.4 | 2.1 | >3.0 | 2.2 | 2.8 |

TABLE 4

| | | Composition of ink | | | | | | | | | | | |
|---|---|---|---|---|---|---|---|---|---|---|---|---|---|
| | | Comparative Example | | | | | | | | | | | |
| | | 1 | 2 | 3 | 4 | 5 | 6 | 7 | 8 | 9 | 10 | 11 | 12 |
| | | Ink | | | | | | | | | | | |
| | | 33 | 34 | 35 | 36 | 37 | 38 | 39 | 40 | 41 | 42 | 43 | 44 |
| Pigment | SDP1 | 10 | 5 | 5 | 5 | 5 | 5 | 5 | | | | | |
| | COJ270Y | | | | | | | | 6 | 6 | 6 | | 6 |
| | RDP2 | | | | | | | | | | | 5 | |
| Resin | ACP1 | 5 | | | | | | | | | | | |
| | ACP5 | | 5 | | | | | | 5 | 5 | 5 | 1 | |
| | ACP6 | | | 5 | | | | | | | | | |
| | JC532J | | | | 5 | | | | | | | | 5 |
| | PU-4 | | | | | 5 | | | | | | | |
| | A662 | | | | | | 5 | | | | | | |
| | R4000 | | | | | | | 5 | | | | | |
| Water-soluble organic solvent | Gly | 10 | 15 | 15 | 15 | 15 | 15 | 15 | 15 | 15 | 15 | 15 | 15 |
| | DEG | 5 | 5 | 5 | 5 | 5 | 5 | 5 | 5 | 5 | 5 | 5 | 5 |
| | PEG800 | 1 | 6 | 6 | 6 | 6 | 6 | 6 | 6 | 6 | 6 | 6 | 6 |
| | 1,2-HD | | 1 | 1 | 1 | | | | | | | | |
| Surfactant | AE40 | | 1 | 1 | 1 | 1 | 1 | 1 | | | | | |
| | D604 | 1 | | | | | | | 1 | 1 | 1 | 1 | 1 |
| Additive | KHCO$_3$ | | | | | | | | | 1 | 15 | | |
| | HCl | | | | | | | | | | | | (pH 4) |
| Main medium | Water | Balance | Balance | Balance | Balance | Balance | Balance | Balance | Balance | Balance | Balance | Balance | Balance |

TABLE 4-continued

| | Composition of ink | | | | | | | | | | | |
|---|---|---|---|---|---|---|---|---|---|---|---|---|
| | Comparative Example | | | | | | | | | | | |
| | 1 | 2 | 3 | 4 | 5 | 6 | 7 | 8 | 9 | 10 | 11 | 12 |
| | | | | | | | Ink | | | | | |
| | 33 | 34 | 35 | 36 | 37 | 38 | 39 | 40 | 41 | 42 | 43 | 44 |
| Rate of aggregation (1) (nm/second) | 2.1 | <0.1 | <0.1 | <0.1 | <0.1 | <0.1 | <0.1 | <0.1 | <0.1 | 1.9 | <0.1 | 2.4 |
| Rate of aggregation (2) (nm/second) | >3.0 | 1.2 | <0.1 | <0.1 | <0.1 | 1.8 | 0.35 | <0.1 | <0.1 | Aggregation | <0.1 | Aggregation |

<Evaluation>

An image was recorded on a recording medium with an inkjet recording apparatus having a construction illustrated in FIG. 1, the apparatus being mounted with a piezo type inkjet head (trade name "KJ4", manufactured by Kyocera Corporation, nozzle density: 600 dpi). The recording was performed under the conditions of: a temperature of 25° C.; a relative humidity of 55%; an ink ejection frequency of 39 kHz; a conveying speed of the recording medium of 100 m/min; and an ink ejection volume at the time of the recording of about 13 pL per dot. In the inkjet recording apparatus, the condition under which one dot of an ink droplet having a mass of 13 ng is applied to a unit region measuring 1/600 inch by 1/600 inch at a resolution of 600 dpi×600 dpi is defined as a recording duty of 100%.

(Color Developability of Image (Before High-temperature Storage))

Solid images each having a size measuring 3 cm by 3 cm (recording duty: 100%) were recorded on recording media with the inkjet recording apparatus. The kinds of the used recording media are as described below.

DL 9084: basis weight: 91 g/m², manufactured by Mitsubishi Paper Mills Limited
OK Prince: basis weight: 64 g/m², manufactured by Oji Paper Co., Ltd.
Vividjet: basis weight: 88 g/m², manufactured by Domtor
NEXT IJ: basis weight: 81 g/m², manufactured by Nippon Paper Industries Co., Ltd.

The optical density of each of the recorded images was measured with a reflection densitometer (trade name "RD-19I", manufactured by GretagMacbeth), and the color developability of the image (before high-temperature storage) was evaluated in accordance with the following evaluation criteria. The results of the evaluation are shown in Tables 5-1 and 5-2. In the following evaluation criteria, the level "A" was defined as a preferred level and the level "B" was defined as an unacceptable level.

[Black Ink, Cyan Ink]
A: The optical density was 1.3 or more.
B: The optical density was less than 1.3.
[Magenta Ink, Yellow Ink]
A: The optical density was 1.2 or more.
B: The optical density was less than 1.2.

(Color Developability of Image (after High-temperature Storage))

An ink immediately after its preparation (ink before high-temperature storage), and an ink stored in a closed space at 60° C. for 2 weeks and then returned to room temperature (ink after high-temperature storage) were provided. A solid image having a size measuring 3 cm by 3 cm (recording duty: 100%) was recorded on a recording medium by using the inkjet recording apparatus and each of the two kinds of inks. The Lab values of the recorded image were measured with a spectrophotometer (trade name "i1 Publish Pro2", manufactured by X-Rite), and a color difference $\Delta E$ between the image recorded with the ink before high-temperature storage and the image recorded with the ink after high-temperature storage was calculated from the following equation (1).

$$\Delta E=((L_b^{*2}-L_a^{*2})+(a_b^{*2}-a_a^{*2})+(b_b^{*2}-b_a^{*2}))^{1/2} \qquad (1)$$

$L_b^*$: The brightness of the image recorded with the ink before high-temperature storage
$L_a^*$: The brightness of the image recorded with the ink after high-temperature storage
$a_b^*$: The a* of the image recorded with the ink before high-temperature storage
$a_a^*$: The a* of the image recorded with the ink after high-temperature storage
$b_b^*$: The b* of the image recorded with the ink before high-temperature storage
$b_a^*$: The b* of the image recorded with the ink after high-temperature storage Then, the color developability of the image (after high-temperature storage) was evaluated in accordance with the following evaluation criteria. The results of the evaluation are shown in Tables 5-1 and 5-2. In the following evaluation criteria, the levels "A" and "B" were defined as preferred levels, and the level "C" was defined as an unacceptable level.

A: The color difference $\Delta E$ was less than 2.
B: The color difference $\Delta E$ was 2 or more and less than 3.
C: The color difference $\Delta E$ was 3 or more.

TABLE 5-1

| | | | Evaluation results | |
|---|---|---|---|---|
| | | | Color developability of image | |
| | Ink | Recording medium | Before high-temperature storage | After high-temperature storage |
| Example 1 | 1 | DL9084 | A | A |
| Example 2 | 1 | OK Prince | A | A |
| Example 3 | 1 | Vividjet | A | A |
| Example 4 | 1 | NEXT IJ | A | A |
| Example 5 | 2 | DL9084 | A | A |
| Example 6 | 3 | DL9084 | A | A |
| Example 7 | 4 | DL9084 | A | A |
| Example 8 | 5 | DL9084 | A | A |
| Example 9 | 6 | DL9084 | A | A |
| Example 10 | 7 | DL9084 | A | A |
| Example 11 | 8 | DL9084 | A | A |
| Example 12 | 9 | DL9084 | A | A |
| Example 13 | 10 | DL9084 | A | A |
| Example 14 | 11 | DL9084 | A | A |
| Example 15 | 12 | DL9084 | A | A |

TABLE 5-1-continued

| | Ink | Recording medium | Color developability of image Before high-temperature storage | Color developability of image After high-temperature storage |
|---|---|---|---|---|
| Example 16 | 13 | DL9084 | A | A |
| Example 17 | 14 | DL9084 | A | B |
| Example 18 | 15 | DL9084 | A | B |
| Example 19 | 16 | DL9084 | A | A |
| Example 20 | 17 | DL9084 | A | A |
| Example 21 | 18 | DL9084 | A | A |
| Example 22 | 19 | DL9084 | A | B |
| Example 23 | 20 | DL9084 | A | A |
| Example 24 | 21 | DL9084 | A | A |
| Example 25 | 22 | DL9084 | A | A |
| Example 26 | 23 | DL9084 | A | A |
| Example 27 | 24 | DL9084 | A | A |
| Example 28 | 25 | DL9084 | A | A |
| Example 29 | 26 | DL9084 | A | A |
| Example 30 | 27 | DL9084 | A | A |
| Example 31 | 28 | DL9084 | A | B |
| Example 32 | 29 | DL9084 | A | B |
| Example 33 | 30 | DL9084 | A | A |
| Example 34 | 31 | DL9084 | A | B |
| Example 35 | 32 | DL9084 | A | A |

TABLE 5-2

| | Ink | Recording medium | Color developability of image Before high-temperature storage | Color developability of image After high-temperature storage |
|---|---|---|---|---|
| Comparative Example 1 | 33 | DL9084 | A | — |
| Comparative Example 2 | 34 | DL9084 | A | C |
| Comparative Example 3 | 35 | DL9084 | A | C |
| Comparative Example 4 | 36 | DL9084 | A | C |
| Comparative Example 5 | 37 | DL9084 | A | C |
| Comparative Example 6 | 38 | DL9084 | A | C |
| Comparative Example 7 | 39 | DL9084 | A | C |
| Comparative Example 8 | 40 | DL9084 | B | C |
| Comparative Example 9 | 41 | DL9084 | B | C |
| Comparative Example 10 | 42 | DL9084 | A | — |
| Comparative Example 11 | 43 | DL9084 | B | C |
| Comparative Example 12 | 44 | DL9084 | A | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-010899, filed Jan. 22, 2016, which is hereby incorporated by reference herein in its entirety.

What is claimed is:

1. An ink comprising:
a pigment;
resin particles;
a water-soluble organic solvent; and
water,
wherein a solid content, containing at least the pigment, of a first liquid, as prepared by (i) diluting the ink 500-fold with water on a mass basis, and (ii) adding $CaCl_2$ so as to bring a concentration of the $CaCl_2$ in the first liquid to 1.5 mM, has a rate of aggregation at 25° C. of 1.5 nm/second or less,
wherein a solid content, containing at least the pigment, of a second liquid, as prepared, after the ink has been stored at 60° C. for 2 weeks, by (i) diluting the ink 500-fold with water on a mass basis, and (ii) adding $CaCl_2$ so as to bring a concentration of the $CaCl_2$ in the second liquid to 5 mM, has a rate of aggregation at 25° C. of 2.0 nm/second or more,
wherein the resin particles are acrylic resin particles or polyurethane resin particles, and
wherein the acrylic resin constituting the acrylic resin particles is a homopolymer or copolymer of one or more (meth)acrylic monomers.

2. The ink according to claim 1, wherein the pigment comprises a phosphonic acid-based self-dispersion pigment having a phosphonic acid group bonded directly or via another atomic group to a surface of each of particles of the pigment.

3. The ink according to claim 2, wherein the phosphonic acid group comprises a bisphosphonic acid group.

4. The ink according to claim 1, wherein the resin particles comprise a constituent unit derived from an ester bond-containing monomer.

5. The ink according to claim 1, wherein the water-soluble organic solvent comprises at least one kind selected from the group consisting of glycerin, ethylene glycol, diethylene glycol, triethylene glycol, a polyethylene glycol having a weight-average molecular weight of 10,000 or less, 1,3-propanediol, 1,4-butanediol, diglycerol, triethylene glycol, and tetraethylene glycol.

6. The ink according to claim 1, further comprising a surfactant.

7. An ink cartridge comprising:
an ink; and
an ink storage portion configured to store the ink,
wherein the ink is an ink comprising a pigment, resin particles, a water-soluble organic solvent, and water,
wherein a solid content, containing at least the pigment, of a first liquid, as prepared by (i) diluting the ink 500-fold with water on a mass basis, and (ii) adding $CaCl_2$ so as to bring a concentration of the $CaCl_2$ in the first liquid to 1.5 mM, has a rate of aggregation at 25° C. of 1.5 nm/second or less,
wherein a solid content, containing at least the pigment, of a second liquid, as prepared, after the ink has been stored at 60° C. for 2 weeks, by (i) diluting the ink 500-fold with water on a mass basis, and (ii) adding $CaCl_2$ so as to bring a concentration of the $CaCl_2$ in the second liquid to 5 mM, has a rate of aggregation at 25° C. of 2.0 nm/second or more,
wherein the resin particles are acrylic resin particles or polyurethane resin particles, and
wherein the acrylic resin constituting the acrylic resin particles is a homopolymer or copolymer of one or more (meth)acrylic monomers.

8. An image recording method comprising:
an ink-applying step of applying an ink to a recording medium,
wherein the ink is an ink comprising a pigment, resin particles, a water-soluble organic solvent, and water, wherein a solid content, containing at least the pigment, of a first liquid, as prepared by (i) diluting the ink 500-fold with water on a mass basis, and (ii) adding $CaCl_2$ so as to bring a concentration of the $CaCl_2$ in the first liquid to 1.5 mM, has a rate of aggregation at 25° C. of 1.5 nm/second or less, wherein a solid content, containing at least the pigment, of a second liquid, as prepared, after the ink has been stored at 60° C. for 2 weeks, by (i) diluting the ink 500-fold with water on a mass basis, and (ii) adding $CaCl_2$ so as to bring a concentration of the $CaCl_2$ in the second liquid to 5 mM, has a rate of aggregation at 25° C. of 2.0 nm/second or more, wherein the resin particles are acrylic resin particles or polyurethane resin particles, and wherein the acrylic resin constituting the acrylic resin particles is a homopolymer or copolymer of one or more (meth)acrylic monomers.

9. The ink according to claim 1, wherein the content of the pigment is from 0.1 mass % to 10.0 mass % based on the total mass of the ink.

10. The ink according to claim 1, wherein the content of the pigment is from 1.0 mass % to 8.0 mass % based on the total mass of the ink.

11. The ink according to claim 1, wherein the content of the resin particles is from 0.1 mass % to 15.0 mass % based on the total mass of the ink.

12. The ink according to claim 1, wherein the content of the resin particles is from 1.0 mass % to 8.0 mass % based on the total mass of the ink.

13. The ink according to claim 1, wherein the total of the content of the pigment and the resin particles is 30 mass % or less based on the total mass of the ink.

14. The ink according to claim 1, wherein the content of the water is from 50 mass % to 90 mass % based on the total mass of the ink.

15. The ink according to claim 1, wherein the water-soluble organic solvent is at least one selected from the group consisting of glycerin, ethylene glycol, diethylene glycol, triethylene glycol, a polyethylene glycol having a weight-average molecular weight of 10,000 or less, 1,3-propanediol, and diglycerol.

16. The ink according to claim 1, wherein the content of the water-soluble organic solvent is from 5 mass % to 45 mass % based on the total mass of the ink.

17. The ink according to claim 6, wherein the surfactant is a nonionic surfactant.

18. The ink according to claim 17, wherein the nonionic surfactant is at least one selected from the group consisting of an ethylene oxide adduct, a fluorine-based surfactant, and a silicone-based surfactant.

19. The ink according to claim 6, wherein the content of the surfactant is from 0.1 mass % to 3.0 mass % based on the total mass of the ink.

20. The ink according to claim 1, wherein the solid content further contains the resin particles.

* * * * *